US012806786B2

(12) United States Patent
Fine et al.

(10) Patent No.: US 12,806,786 B2
(45) Date of Patent: Nov. 24, 2026

(54) SYSTEMS AND METHODS FOR CONFIGURING A ROBOT TO INTERFACE WITH EQUIPMENT

(71) Applicant: Amgen Inc., Thousand Oaks, CA (US)

(72) Inventors: Jordan Ray Fine, Ventura, CA (US); Andrew C. Tresansky, Cambridge, MA (US)

(73) Assignee: Amgen Inc., Thousand Oaks, CA (US)

( * ) Notice: Subject to any disclaimer, the term of this patent is extended or adjusted under 35 U.S.C. 154(b) by 18 days.

(21) Appl. No.: 18/857,085

(22) PCT Filed: May 2, 2023

(86) PCT No.: PCT/US2023/020685
§ 371 (c)(1),
(2) Date: Oct. 15, 2024

(87) PCT Pub. No.: WO2023/215283
PCT Pub. Date: Nov. 9, 2023

(65) Prior Publication Data

US 2025/0256403 A1 Aug. 14, 2025

Related U.S. Application Data

(60) Provisional application No. 63/337,915, filed on May 3, 2022.

(51) Int. Cl.
*B25J 9/16* (2006.01)
*B25J 19/02* (2006.01)
(Continued)

(52) U.S. Cl.
CPC ........... *B25J 9/1692* (2013.01); *B25J 19/023* (2013.01); *G06T 7/73* (2017.01); *H04N 23/695* (2023.01); *G06T 2207/30204* (2013.01)

(58) Field of Classification Search
CPC ...... B25J 9/1692; B25J 9/0093; B25J 9/1697; B25J 19/023; B25J 13/08; G06T 7/73;
(Continued)

(56) References Cited

U.S. PATENT DOCUMENTS

| | | | | |
|---|---|---|---|---|
| 10,035,267 B2 | 7/2018 | Matthias et al. | | |
| 2015/0316925 A1* | 11/2015 | Frisk | B25J 9/162 901/1 | |

(Continued)

FOREIGN PATENT DOCUMENTS

| | | |
|---|---|---|
| CN | 102 674 073 | 9/2012 |
| EP | 1 607 194 | 12/2005 |

(Continued)

OTHER PUBLICATIONS

International Search Report and Written Opinion for International Application No. PCT/US2023/020685 mailed Jul. 31, 2023.

*Primary Examiner* — Nhi Q Bui
(74) *Attorney, Agent, or Firm* — Wolf, Greenfield & Sacks, P.C.

(57) ABSTRACT

Computer vision techniques for configuring a robot having a robotic arm to interface with equipment to perform a task. The techniques include: capturing at least one image of the equipment: determining a position of a first alignment feature in the at least one captured image: determining, using the position of the first alignment feature in the at least one captured image, an alignment difference between a current alignment of the robot and the equipment with respect to a prior alignment of the robot and the equipment; and configuring the robot to interface with the equipment based on the alignment difference.

39 Claims, 19 Drawing Sheets

(51) Int. Cl.
*G06T 7/73* (2017.01)
*H04N 23/695* (2023.01)

(58) Field of Classification Search
CPC ........ G06T 2207/30204; H04N 23/695; B65C 9/00
See application file for complete search history.

(56) References Cited

U.S. PATENT DOCUMENTS

| | | | | |
|---|---|---|---|---|
| 2017/0057082 | A1* | 3/2017 | Grigorenko | B25J 5/02 |
| 2019/0160677 | A1 | 5/2019 | Strandberg | |
| 2020/0023521 | A1 | 1/2020 | Dan | |
| 2020/0198147 | A1* | 6/2020 | Fredrickson | B25J 9/0084 |
| 2021/0146552 | A1* | 5/2021 | Hong | A47L 11/4011 |
| 2021/0292025 | A1 | 9/2021 | Hahn et al. | |
| 2021/0387301 | A1* | 12/2021 | O'Hare | G01B 5/008 |
| 2022/0048198 | A1* | 2/2022 | Jonas | B25J 9/0084 |
| 2022/0080584 | A1 | 3/2022 | Wicks et al. | |

FOREIGN PATENT DOCUMENTS

| | | |
|---|---|---|
| EP | 3 705 239 | 9/2020 |
| EP | 3 912 917 | 11/2021 |
| EP | 3 960 392 | 3/2022 |
| WO | WO 2017/133781 | 8/2017 |
| WO | WO 2017/215732 | 12/2017 |
| WO | WO 2019/076445 | 4/2019 |
| WO | WO 2022/043083 | 3/2022 |

* cited by examiner $$\text{Offset} = P_1{}' - P_1 = x_{P_1{}'}, y_{P_1{}'}$$

$$\theta = \tan^{-1}\left(\frac{y_{P_2{}'} - y_{P_1{}'}}{x_{P_2{}'} - x_{P_1{}'}}\right)$$

$$\begin{pmatrix} x' \\ y' \end{pmatrix} = \begin{pmatrix} x_{P1'} & 0 \\ 0 & y_{P1'} \end{pmatrix} + \begin{pmatrix} \cos\theta & \sin\theta \\ -\sin\theta & \cos\theta \end{pmatrix}\begin{pmatrix} x \\ y \end{pmatrix}$$

SYSTEMS AND METHODS FOR CONFIGURING A ROBOT TO INTERFACE WITH EQUIPMENT

CROSS-REFERENCE TO RELATED APPLICATIONS

This application is a national stage filing under 35 U.S.C. 371 of International Patent Application Serial No. PCT/US2023/020685, filed May 2, 2023, entitled "SYSTEMS AND METHODS FOR CONFIGURING A ROBOT TO INTERFACE WITH EQUIPMENT", which claims the benefit of priority to U.S. Provisional Patent Application Ser. No. 63/337,915, filed May 3, 2022, titled "SYSTEMS AND METHODS FOR CONFIGURING A ROBOT TO INTERFACE WITH EQUIPMENT," which is incorporated by reference herein in its entirety.

FIELD

Aspects of the technology described herein relate to configuring a robot to interface with equipment. In particular, the technology described herein involves using computer vision techniques to facilitate aligning a robot to equipment so that the robot may interface with the equipment to perform a task.

BACKGROUND

Robots are used for a wide range of applications in a wide variety of industrial environments, such as, for example, manufacturing facilities, factories, warehouses, assembly lines, and fulfilment centers. Some robots have robotic arms, which may be used to perform tasks on objects. For example, a robotic arm may pick up an object (e.g., using a gripper, vacuum suction, etc.) in one location and place it in another location (e.g., place the object on a shelf, a movable platform, an assembly line, etc.). As another example, a robotic arm may apply a tool (e.g., a drill, screwdriver, welder, etc.) to the object (e.g., a robotic arm may be equipped with a drill and may drill a hole in the object).

Many tasks performed by robots in an industrial environment may be collaborative and may involve a robot interfacing with equipment and, as such, may require moving the robot and/or its components to specific positions and/or orientations relative to the equipment to perform the tasks. For example, a robot having a robotic arm may interface with equipment having a conveyor belt by picking up an object and placing it on the conveyor belt. For instance, a robot may place an object (e.g., a bottle) on the conveyor belt of a labelling machine (or any other suitable machine) so that the labelling machine may apply a label (or perform any other suitable action) on the object. As another example, a robot having a robotic arm may apply a tool (e.g., a drill) to an object held by another robotic arm. As yet another example, a robotic arm may place an object onto a moving autonomously guided vehicle (AGV). As yet another example, a robot having a robotic arm may place an object onto a tray.

In order for a robot to perform a collaborative task by interfacing with equipment, a robot first has to be aligned to (sometimes termed "registered with" or "calibrated to") the equipment so that the robot has access to, in the robot's coordinate system, precise positions relative to the equipment to which the robot will move one or more of its components during performance of the collaborative task. For example, if a robot is to use its robotic arm to place an object on a machine having a conveyor belt, then aligning the robot with the machine enables the robot to determine, in its own coordinate system (e.g., the coordinate system in which it is controlling its robotic arm), the location of the conveyor belt and the position on the conveyor belt at which to place the object, and therefore the precise position to which to move the end effector of the robotic arm to perform this task.

In addition, aligning the robot to the equipment enables the robot to move its robotic arm to the target positions relative to the equipment while avoiding inadvertent contact between the robot and the equipment (or other things) to avoid damage to the robot, the equipment, the objects being handled, etc. For instance, in an assembly line for labelling bottles (e.g., vials in a pharmaceutical company assembly line), a robot needs to be aligned with the labelling machine so that the robotic arm can move a bottle from one location (e.g., a storage tray) to another location (e.g., a conveyer belt) at the machine.

A precise alignment between a robot and any equipment it interfaces with is needed because the operation of the robot can introduce risks, particularly if the robot were unsupervised. For example, a misalignment between the robot and the labelling machine could lead to the robotic arm mishandling the bottles, which may cause breakage of the bottles, damage to the robot, and/or damage to the labelling machine.

SUMMARY

Some embodiments provide for a system for configuring a robot to interface with equipment to perform a task, the robot comprising a robotic arm, the system comprising: at least one imaging sensor; and at least one processor configured to: (A) obtain at least one image of the equipment captured by the at least one imaging sensor; (B) determine at least one current position of at least one alignment feature in the at least one captured image, wherein the at least one alignment feature is part of or on the equipment; (C) determine, using the at least one current position of the at least one alignment feature in the at least one captured image, an alignment difference between a current alignment of the robot and the equipment with respect to a prior alignment of the robot and the equipment; and (D) configure the robot to interface with the equipment based on the alignment difference.

Some embodiments provide for a method for configuring a robot to interface with equipment to perform a task using at least one imaging sensor, the robot comprising a robotic arm, the method comprising using at least one processor to perform: (A) obtaining at least one image of the equipment captured by the at least one imaging sensor; (B) determining at least one current position of at least one alignment feature in the at least one captured image, wherein the at least one alignment feature is part of or on the equipment; (C) determining, using the at least one current position of the at least one alignment feature in the at least one captured image, an alignment difference between a current alignment of the robot and the equipment with respect to a prior alignment of the robot and the equipment; and (D) configuring the robot to interface with the equipment based on the alignment difference.

Some embodiments provide for at least one non-transitory computer-readable medium storing processor-executable instructions that, when executed by at least one computer hardware processor, cause the at least one computer hardware processor to execute a method for configuring a robot to interface with equipment to perform a task using at least one imaging sensor, the robot comprising a robotic arm, the method comprising using at least one processor to perform: (A) obtaining at least one image of the equipment captured by the at least one imaging sensor; (B) determining at least one current position of at least one alignment feature in the at least one captured image, wherein the at least one alignment feature is part of or on the equipment; (C) determining, using the at least one current position of the at least one alignment feature in the at least one captured image, an alignment difference between a current alignment of the robot and the equipment with respect to a prior alignment of the robot and the equipment; and (D) configuring the robot to interface with the equipment based on the alignment difference.

Some embodiments provide for a system for configuring first equipment to interface with second equipment to perform a task, the system comprising: at least one imaging sensor; and at least one processor configured to: (A) obtain at least one image of the second equipment captured by the at least one imaging sensor; (B) determine at least one current position of at least one alignment feature in the at least one captured image, wherein the at least one alignment feature is part of or on the second equipment; (C) determine, using the at least one current position of the at least one alignment feature in the at least one captured image, an alignment difference between a current alignment of the first equipment and the second equipment with respect to a prior alignment of the first equipment and the second equipment; and (D) configure the first equipment to interface with the second equipment based on the alignment difference.

Some embodiments provide for a method for configuring first equipment to interface with second equipment to perform a task, the method comprising using at least one processor to perform: (A) obtaining at least one image of the second equipment captured by the at least one imaging sensor; (B) determining at least one current position of at least one alignment feature in the at least one captured image, wherein the at least one alignment feature is part of or on the second equipment; (C) determining, using the at least one current position of the at least one alignment feature in the at least one captured image, an alignment difference between a current alignment of the first equipment and the second equipment with respect to a prior alignment of the first equipment and the second equipment; and (D) configuring the first equipment to interface with the second equipment based on the alignment difference.

Some embodiments provide for at least one non-transitory computer-readable medium storing processor-executable instructions that, when executed by at least one computer hardware processor, cause the at least one computer hardware processor to execute a method for configuring first equipment to interface with second equipment to perform a task, the method comprising using at least one processor to perform: (A) obtaining at least one image of the second equipment captured by the at least one imaging sensor; (B) determining at least one current position of at least one alignment feature in the at least one captured image, wherein the at least one alignment feature is part of or on the second equipment; (C) determining, using the at least one current position of the at least one alignment feature in the at least one captured image, an alignment difference between a current alignment of the first equipment and the second equipment with respect to a prior alignment of the first equipment and the second equipment; and (D) configuring the first equipment to interface with the second equipment based on the alignment difference.

Some embodiments provide for a method for configuring a robot to interface with equipment to perform a task using a two-stage alignment procedure, the robot comprising a robotic arm, the method comprising: (1) initially aligning the robot with the equipment using one or more mechanical devices and/or one or more sensors; and (2) further aligning the robot with the equipment using at least one image of the equipment captured by at least one imaging sensor, the further aligning comprising using at least one processor to perform: (A) obtaining at least one image of the equipment captured by at least one imaging sensor; (B) determining at least one current position of at least one alignment feature in the at least one captured image, wherein the at least one alignment feature is part of or on the equipment; (C) determining, using the at least one current position of the at least one alignment feature in the at least one captured image, an alignment difference between a current alignment of the robot and the equipment with respect to a prior alignment of the robot and the equipment; and (D) configuring the robot to interface with the equipment based on the alignment difference.

Some embodiments provide for at least one non-transitory computer-readable medium storing processor-executable instructions that, when executed by at least one computer hardware processor, cause the at least one computer hardware processor to execute a method for configuring a robot to interface with equipment to perform a task using a two-stage alignment procedure, the robot comprising a robotic arm, the method comprising: (1) initially aligning the robot with the equipment using one or more mechanical devices and/or one or more sensors; and (2) further aligning the robot with the equipment using at least one image of the equipment captured by at least one imaging sensor, the further aligning comprising using at least one processor to perform: (A) obtaining at least one image of the equipment captured by at least one imaging sensor; (B) determining at least one current position of at least one alignment feature in the at least one captured image, wherein the at least one alignment feature is part of or on the equipment; (C) determining, using the at least one current position of the at least one alignment feature in the at least one captured image, an alignment difference between a current alignment of the robot and the equipment with respect to a prior alignment of the robot and the equipment; and (D) configuring the robot to interface with the equipment based on the alignment difference.

Some embodiments provide for a system for configuring a robot to interface with equipment to perform a task using a two-stage alignment procedure, the robot comprising a robotic arm, the system comprising: at least one imaging sensor; and at least one processor configured to perform, after initially aligning the robot with the equipment using one or more mechanical devices and/or one or more sensors, further aligning the robot with the equipment using at least one image of the equipment captured by at least one imaging sensor, the further aligning comprising: (A) obtaining at least one image of the equipment captured by at least one imaging sensor; (B) determining at least one current position of at least one alignment feature in the at least one captured image, wherein the at least one alignment feature is part of or on the equipment; (C) determining, using the at least one current position of the at least one alignment feature in the at least one captured image, an alignment difference between a current alignment of the robot and the equipment with respect to a prior alignment of the robot and the equipment; and (D) configuring the robot to interface with the equipment based on the alignment difference.

BRIEF DESCRIPTION OF THE DRAWINGS

Various non-limiting embodiments of the technology developed by the inventors are described herein with reference to the following figures. It should be appreciated that the figures and the components in the figures are not necessarily drawn to scale. In the figures, like-referenced numerals designate corresponding parts.

DETAILED DESCRIPTION

Figure 1A:
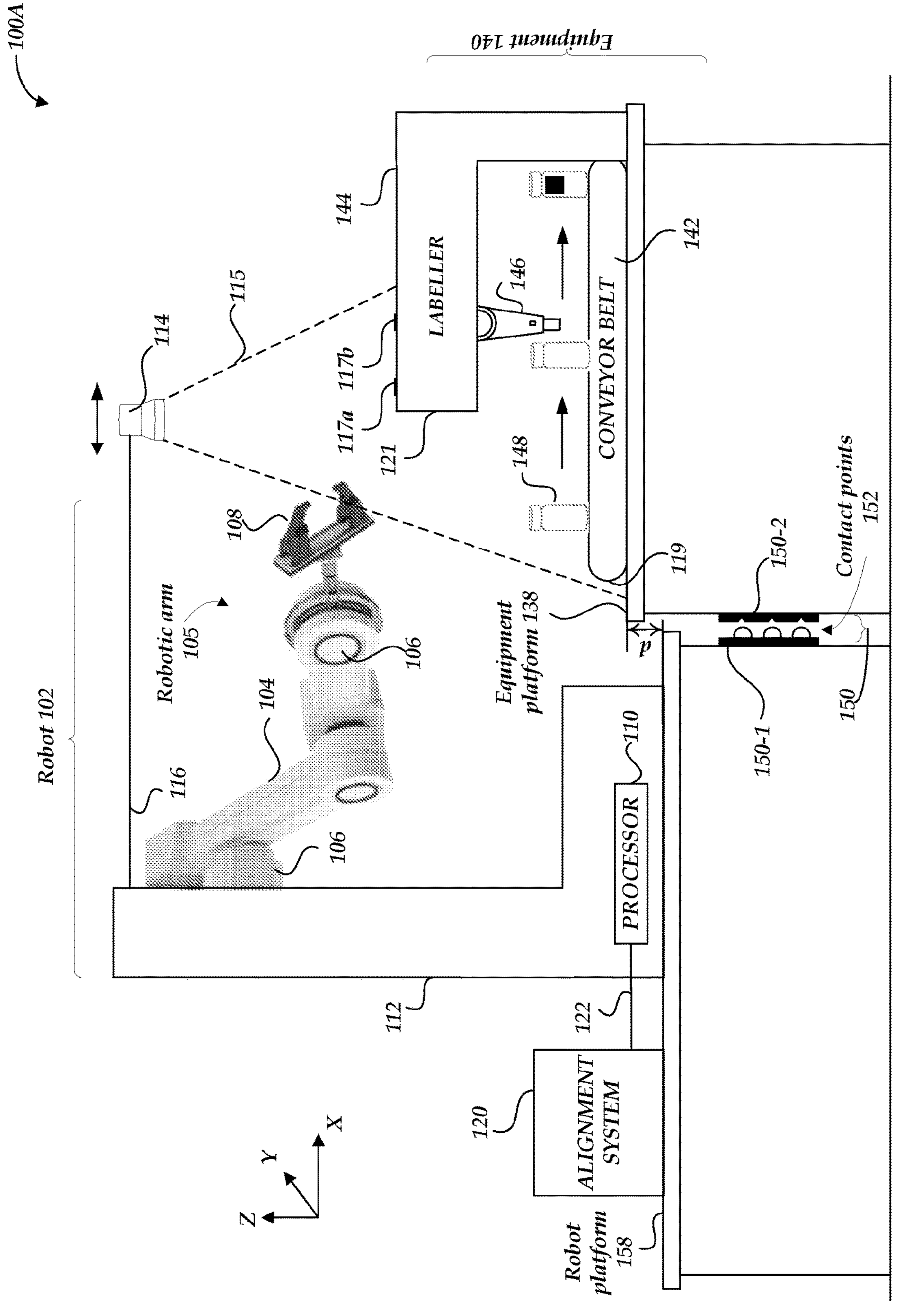
FIG. 1A is a schematic diagram of an illustrative system for configuring a robot, having a robotic arm, to interface with equipment to perform a task, the system enabling the robot to be initially aligned to the equipment using an example mechanical interface and further aligned to the equipment using one or more images obtained from an imaging sensor part of the system, in accordance with some embodiments of the technology described herein.

As described above, for a robot to interface with equipment to perform a task, the robot is first aligned to the equipment. In this way, the robot will have access to positions of the equipment and its various parts in the robot's coordinate system. The alignment will allow the robot to accurately interface with the equipment, for example, by moving its robotic arm through a sequence of precise positions relative to the equipment to perform various actions that are part of the task (e.g., picking up an object on a tray, moving the object from the tray to a position proximate the equipment, and placing the object on the equipment).

Conventional techniques for aligning a robot to equipment involve a complex configuration process because multiple movable parts of the robot (e.g., a multi-axis robotic arm) have to be configured to be able to accurately interface with multiple different components of the equipment to enable the robotic arm to move to the target positions, while avoiding undesired contact between the robotic arm and the equipment or other objects. As such, the positions through which the robot components travel or to which they move in a sequence of operations when the robot collaborates with the equipment are carefully determined and carefully programmed into the robot in advance of the robot being used. In many systems, once a robot is configured to interface with equipment with these positions, both the robot and the equipment are locked in position to avoid an inadvertent change in relative positions of the robot and equipment triggering a need to update those positions.

The inventors have recognized and appreciated that such conventional techniques have numerous disadvantages. First, the configuration task is a highly laborious process, often involving manual intervention by skilled personnel, because there is a need to specify with absolute precision the various positions to which robot components will move to interface with the equipment. And this burdensome configuration process means that deploying robots to perform collaborative tasks is often costly. Once a robot has been aligned to equipment, users, or administrators of the robots and/or the equipment are often reluctant to alter the configuration (e.g., by moving the robot or the equipment). This means that each robot can only be used for one purpose at a time. This is the case even if the robot and equipment sit idle for long stretches of time, and even where the robots and/or equipment are quite costly, such as costing multiple tens or hundreds of thousands of dollars or more. It is often the case that a company could have multiple such robots and/or equipment, each configured for only an individual use and each sitting idle for long stretches of time. Moreover, any disturbance to the configuration (slight movement of the platform supporting the robot and/or the equipment) means that the robot and equipment become misaligned, and that the entire configuration process must be repeated.

The inventors recognized and appreciated that there would be a benefit from a single robot being able to be configured to perform multiple tasks and be movable between positions to perform those tasks. For example, a robot may be needed to work with a labelling machine for labelling bottles for one drug for a week, then work with another labelling machine in a different assembly line for labelling bottles for another type of drug for two days in that week. In turn, the robot may be used again to work with the previous labelling machine for labelling bottles for the previous drug for another three days, then switch to another different labelling machine. Conventionally, such product line scheduling is difficult to accommodate using one robot because it would require frequent reconfigurations from scratch, to redefine wholly the positions to which the robot components will be moved to interface with each of the three machines. This is the case, conventionally, because even if a robot is moved back to a prior machine to interface with the same machine with which it interfaced before, the configuration from scratch has been needed to ensure the movements of the robot with respect to the machine are to positions where the robot, machine, or other things in the surrounds will not be damaged.

Figure 9A:
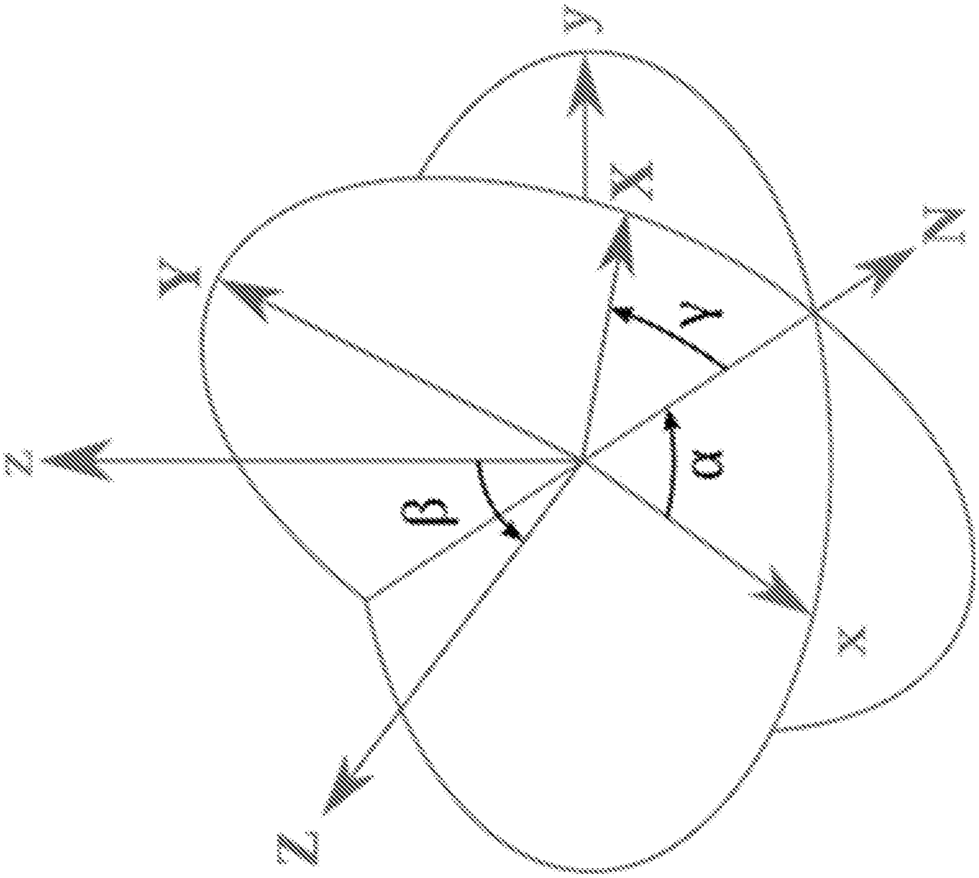
FIG. 9A illustrates Euler angles for two arbitrarily oriented 3-dimensional coordinate systems.
Figure 9B:
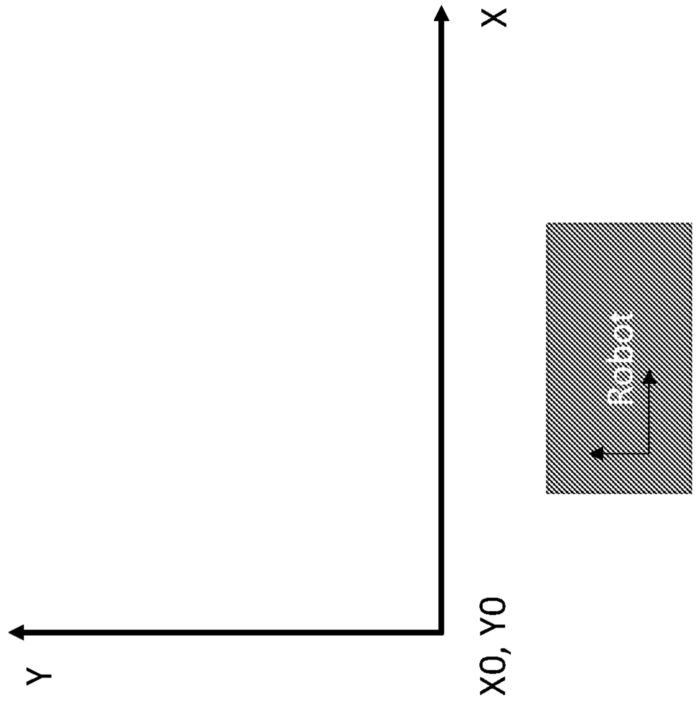
FIGS. 9B-9C illustrate a technical challenge arising when repeatedly configuring a robot to interface with equipment by repeatedly aligning the coordinate systems of the robot and the equipment.
Figure 9C:
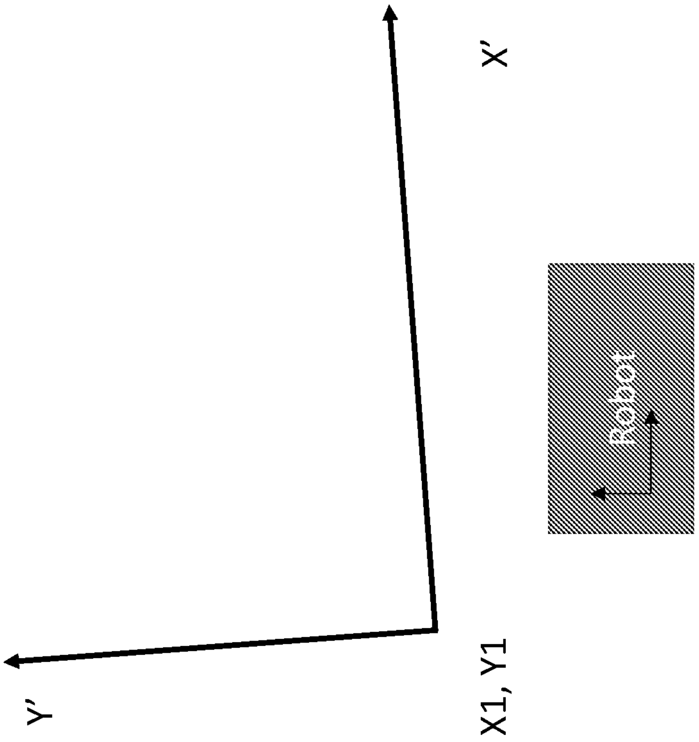

For example, a robot may be aligned to equipment such that the equipment reference frame (relative to the robot) at the time of configuration is recorded and stored (e.g., the original equipment reference frame of FIG. 9B). However, if the robot is moved away from the equipment, used to perform other tasks, and then subsequently brought back near to the equipment, the equipment reference frame (relative to the robot) may be different from the reference frame stored and record and may be in an arbitrary orientation relative to the robot (e.g., as shown in FIG. 9C). As a result, the robot cannot be operated without being reconfigured, which is complex and burdensome using conventional methods, as discussed above.

The inventors have appreciated that it would be desirable to reduce the complexity and burden associated with configuring a robot to interface with different pieces of equipment, and to do so in a plug-and-play manner so that the robot may be repeatedly docked with and aligned to different pieces of equipment. If the configuration burden of each alignment could be reduced, a robot may be more easily moved between equipment and adapted to preform different tasks for different applications and production schedules. Thus, for example, a robot may be arranged with first equipment to perform a first task, then detached from the first equipment and arranged with second equipment to perform a second task, then subsequently arranged with the first equipment again to perform the first task again. With an easier configuration process, a robot may be configured to better suit the needs of users, which may result in a high utilization of the robot and a saving (in both cost and space) in production.

Accordingly, the inventors have developed new technology to mitigate the above-described disadvantages associated with configuring a robot to perform a task that involves interfacing with equipment. This technology involves computer vision and facilitates repeated use of the same robot for multiple different applications. Using the techniques described herein and developed by the inventors, a single robot can be easily aligned to different equipment with a high degree of precision such that a single robot can interface with different equipment for multiple uses. In switching among the multiple uses, the robot can be re-aligned with equipment previously interfaced with, when in a prior alignment with that equipment, without the need to fully reconfigure the robot to interface with the equipment. This contrasts with conventional techniques, which require fully reconfiguring the robot in such a circumstance. The techniques developed by the inventors may also be used to re-align a robot and equipment that have become misaligned due to a disturbance (e.g., robot and/or equipment gets inadvertently bumped out of position).

The technology developed by the inventors involves using one or more computer vision techniques to obtain a current alignment between the robot and the equipment by correcting a prior alignment between the robot and the equipment using information derived from one or more images of the equipment. For example, a prior alignment between a robot and equipment may be adjusted by: (1) determining where one or more alignment features (e.g., one or more visual markers affixed to or painted on the equipment, or a visual feature of the equipment, such as an edge or a corner) are located on the equipment relative to prior reference position(s) of the same alignment feature(s); and (2) using the difference between the current and previous positions of the alignment feature(s), together with the prior alignment, to determine the current alignment. In particular, the current alignment may be obtained using the prior alignment and the difference between the reference position and the current position(s) of the alignment feature(s) as an offset.

Once the current alignment is obtained, the robot may be configured to interface with the equipment according to the current alignment to perform one or more actions in furtherance of a given task. For example, the robot may have been configured to perform a sequence of operations with respect to the equipment, where in the sequence a component of the robot (e.g., a robotic arm) may move through a sequence of positions.

The robot may be configured to use the alignment difference, in the sequence of operations with which the robot was previously configured, to adjust the positions of the sequence of positions to which the component(s) of the robot move through the sequence of operations and account for the change in alignment that occurred since the robot was configured or previously arranged with respect to the equipment.

In some embodiments, the techniques developed by the inventors involve aligning a robot and equipment with which the robot interfaces using at least two visual markers on the equipment. The two markers may correspond to two reference positions (e.g., two markers on the equipment each having a graphical pattern), which the alignment system knows from the prior alignment. When the robot and the equipment are re-attached, the system may detect the positions of the two visual markers in images (e.g., images taken by a camera) and determine offsets of the current positions of the two visual markers with respect to the stored reference positions. The offsets of the positions of the visual markers are then used to determine an adjustment of the prior alignment between the robot and the equipment to derive the current alignment. For example, the system may use the offset of the position of the first marker to determine a translation of the coordinate system in the prior alignment and use the offset of the position of the second market to determine a rotation of the coordinate system in the prior alignment. Then, the system may apply the translation and the rotation to the coordinate system of the prior alignment to determine a relationship between the coordinate system of the prior alignment and the coordinate system of the current alignment. Once the current alignment is obtained, the robot may be configured to interface with the equipment according to the current alignment.

The inventors have recognized that, in some instances, the above-described computer-vision technique may be more effective if prior to its application for aligning or re-aligning a robot with equipment, the robot and the equipment are initially aligned (e.g., "coarsely" or "roughly") so as to get the alignment "in the ball park", and the computer-vision based technique is then used to do refine the initial alignment to get a more accurate alignment. In this way, the robot and equipment may be aligned using a two-stage alignment procedure: (1) in a first stage, a mechanical interface (e.g., comprising one or more mechanical fixtures) and/or other sensors (e.g., distance sensors) may be used to position the robot and the equipment relative to one another so as to provide an initial (e.g., "rough" or "coarse") alignment (this initial alignment may then be "locked" or "clamped" into place; and (2) in a second stage, the initial alignment may be updated (e.g., "refined") using the computer vision techniques described herein (e.g., by imaging visual markers, detecting their positions, comparing their detected new positions to their prior reference positions to determine offsets, and using the offsets to update the alignment and/or programming of the robot). Such a two-stage approach may not only improve overall accuracy of the resulting alignment but may also reduce the computational complexity associated with computer-vision alignment techniques described herein because there would be fewer degrees of freedom and/or reduced error to address the misalignment.

In some embodiments, for example, an initial alignment may be provided using a mechanical interface having one or more mechanical fixtures. For example, in some embodiments, the Z-plane of the robot and the Z-plane of the equipment may be aligned via mechanical fixtures. For example, a horizontal platform (e.g., a table) of the robot and a horizontal platform of the equipment may be aligned so that any misalignment is limited to an alignment difference in non-vertical (i.e., X and Y) directions, which results in the reduction of complexity of alignment. For example, once the Z-planes for both the robot and the equipment are aligned, the number of uncertain variables in an alignment may be reduced from six parameters to three parameters. For example, as shown in FIG. 9A, an alignment may include six variables—an anchor point (X, Y, Z) and three Euler angles, $\alpha$, $\beta$, and $\gamma$ between coordinate frames. Fixing the Z-planes for both the robot and the equipment (e.g., using a single table or separate platforms that have fixed heights and locked into reference positions on a level floor) leaves only three variables (i.e., X, Y, and a) to be determined through alignment. In such a case, only two reference positions (e.g., for two visual markers) may be needed. As a result, both the operations for alignment and the computations required of determining an alignment can be reduced (e.g., without such an initial alignment a greater number of visual markers may need to be used and that increases the computational complexity of algorithms needed to align multiple markers across multiple degrees of freedom).

Several types of mechanical fixtures may be used to align a robot and equipment and achieve an initial degree of accuracy (e.g., to a few thousandths of an inch). In some embodiments, alignment pins may be used to secure the robot and equipment to a common platform (a table). An example of one such embodiment is shown in FIG. 1C. Additionally or alternatively, the robot and equipment may be on platforms having mateable interfaces (which may be referred to as "docking interfaces" herein) and the mateable interfaces may be used to initially align the robot and the equipment. For example, the mateable interfaces may comprise mateable plates configured to contact one another at multiple contact points, for example, using ball bearings and detents. Additionally or alternatively, other mechanical and/or electronic devices may be used to align a robot and equipment. For example, magnetic fixtures, electro-mechanical latches, and/or distance sensors may be used.

After an initial alignment is performed, in some embodiments, a clamping system may be used to secure the robot to the equipment. Any suitable clamping system may be used and may include locking clamps, bolts, electromagnets, and/or any other suitable means for securing the robot to the equipment.

The techniques described herein provide advantages over conventional alignment methods and systems for aligning a robot and equipment by reducing the complexity associated with aligning the robot and the equipment in the conventional approach. For example, using mechanical fixtures and/or sensors to achieve a rough alignment between the robot and the equipment may reduce the number of parameters and thus, computational complexity in subsequent computer-vision based alignment. In addition, the alignment techniques described herein determine an alignment difference between a prior alignment and a current alignment using computer vision techniques. Such techniques allow the robot to be repeatably connected to equipment previously used (and aligned) without performing time-consuming and burdensome alignment operations as would be the case in an initial alignment with conventional robots. Indeed, computer-vision assisted updating of a prior alignment (after any mechanical fixtures are used to obtain a rough alignment) may be performed automatically and without user intervention, in some embodiments.

Accordingly, some embodiments provide for techniques for configuring a robot having a robotic arm to interface with equipment to perform a task using data collected by at least one imaging sensor (e.g., one imaging sensor or multiple imaging sensors, for example a 2D array of imaging sensors). The techniques involve: (A) obtaining at least one image of the equipment captured by the at least one imaging sensor (e.g., when the robot is disposed proximate the equipment, for example, after being initially aligned to it using the techniques described herein including, for example, a mechanical interface and/or one or more other sensors like distance sensors); (B) determining at least one current position of at least one alignment feature (e.g., one or more visual markers, one or more visual features of the equipment such as an edge or a corner) in the at least one captured image (e.g., using a pattern matching technique, an edge detection technique, an object detection technique, or a blob detection technique); (C) determining, using the at least one current position of the at least one alignment feature in the at least one captured image, an alignment difference between a current alignment of the robot and the equipment with respect to a prior alignment of the robot and the equipment; (D) configuring the robot to interface with the equipment based on the alignment difference (e.g., by determining the current alignment based on the prior alignment and the alignment difference and configuring the robot to interface with the equipment according to the current alignment). The techniques may further involve, following the configuring, causing the robotic arm to interface with the equipment to perform one or more actions in furtherance of the task.

A robot may be disposed proximate the equipment when the robot is within a threshold distance (e.g., within 10 meters, within 5 meters, within 1 meter, within 500 cm, within 100 cm, within 50 cm, within 10 cm, within 1 cm, within 500 mm, within 100 mm, within 50 mm, within 10 mm, within 5 mm) of the equipment. A robot may be disposed proximate the equipment when, the orientation angle θ between the robot and the equipment is within a threshold number of degrees (e.g., within 5 degrees, within 1 degree) of what the orientation angle was between the robot and the equipment during a prior alignment. A robot may be disposed proximate the equipment when, the translational offset (x,y) between the robot and the equipment is within a threshold distance (e.g., within 10 meters, within 5 meters, within 1 meter, within 500 cm, within 100 cm, within 50 cm, within 10 cm, within 1 cm, within 500 mm, within 100 mm, within 50 mm, within 10 mm, within 5 mm) of what the distance was between the robot and the equipment during a prior alignment.

A robot may be any machine having one or more moveable parts that may be programmatically controlled using hardware, software, or any suitable combination thereof. A robot may comprise at least one processor (which may be termed "a controller") that may cause the moveable part(s) to perform a series of one or more movements. Additionally, a robot may include one or more sensors of any suitable type and data collected by the sensors may be used to impact the way in which the at least one processor controls the moveable part(s). In some embodiments, a robot may have one or more robotic arms affixed to a body or multiple bodies. In other embodiments, a robot may consist of a single robotic arm, which may then be secured to a surface (e.g., a wall, the surface of a movable or a fixed platform).

A robotic arm may be any suitable type of mechanical arm comprising one or more links connected by zero, one, or multiple joints. A joint may allow rotational motion and/or translational displacement. The links of the arm may be considered to form a chain and the terminus of the chain may be termed an "end effector." A robotic arm may have any suitable number of links (e.g., 1, 2, 3, 4, 5, etc.). A robotic arm may have any suitable number of joints (0, 1, 2, 3, 4, 5, etc.). For example, a robotic arm may be a multi-axis articulated robot having multiple rotary joints. A robot may include at least one actuator configured to move at least one of the one or more links to cause the robotic arm to interface with the equipment using its end effector. A robot may have multiple robotic arms each having their respective end effectors. In some embodiments, one or more imaging sensors may be coupled to a robotic arm. Thus, in some embodiments, a robot may have one or more robotic arms each of which may be coupled to zero, one or more imaging sensors.

An end effector may be any suitable terminus of a robotic arm. An end effector may comprise a gripper, a tool, and/or a sensing device. A gripper may be of any suitable type (e.g., jaws or fingers to grasp an object, pins/needles that pierce the object, a gripper operating by attracting an object through vacuum, magnetic, electric, or other techniques). A tool may be a drill, screwdriver, welder, or any other suitable type of tool configured to perform an action on an object and/or alter an aspect of the object. A sensing device may be an imaging sensor, an optical sensor, an electrical sensor, a magnetic sensor, a thermal sensor, and/or any other suitable sensing device.

An imaging sensor used for configuring a robot to interface with equipment in accordance with embodiments described herein may be of any suitable type. For example, the imaging sensor may include one or more cameras. An imaging sensor may detect light in any suitable band of the electromagnetic spectrum (e.g., visible band, infrared band, ultraviolet band, etc.). The imaging sensor may include a charge-coupled device (CCD) sensor or a complementary metal oxide semiconductor (CMOS) sensor. In some embodiments, the imaging sensor may include an imaging array (e.g., a 2D array) comprising multiple imaging sensors.

In some embodiments, the at least one imaging sensor may be physically separate from the robot such that movement of the robot (e.g., its robotic arm) does not change the position of the imaging sensor(s). For example, the at least one imaging sensor may include a camera positioned above the equipment such that at least a portion of the equipment is in the field of view of the camera (see e.g., FIG. 1A). In other embodiments, the at least one imaging sensor may be physically coupled to the robot such that movement of the robot (e.g., its robotic arm) changes the position of the imaging sensor(s). For example, as shown in the example of FIG. 1B, the at least one imaging sensor is physically coupled to a robotic arm of the robot. The robotic arm may be controlled to position the camera so that the at least one alignment feature is in the field of view of the at least one imaging sensor when the at least one imaging sensor is used to capture the at least one image. In some embodiments, multiple imaging sensors may be physically coupled to the robot. For example, multiple imaging sensors may be coupled to a robotic arm. As another example, the robot may have multiple robotic arms each of which may be coupled to one or more imaging sensors.

In some embodiments, the system may cause the at least one imaging sensor to capture one or more images of the equipment (e.g., by having the system send one or more commands to the image sensor(s)), which images may then be used for alignment. In other embodiments, the at least one imaging sensor may be operated independently of the system (e.g., manually or by another automated process) and the images captured by the imaging sensor(s) may be provided to the system for use in aligning the robot to the equipment.

Equipment may be any suitable thing with which a robot may interface. It may be any suitable thing in an industrial environment such as a factory, a manufacturing facility, an assembly line, and the like. For example, equipment may include one or more machines. A machine may have one or more electronic and/or mechanical components that may be controlled to apply one or more forces. As one specific example, which is referred to in various examples herein, a machine may be a labelling machine configured to apply labels to one or more items (e.g., bottles, tubes, etc.). However, equipment is not limited to being a machine and may include any other suitable thing with which a robot may interface such as, for example, a tray of components (e.g., tubes in a tray), any object that may be picked up by a robotic arm and placed in another location and/or re-oriented (e.g., a box, a part, a tool), any object to which the robotic arm may apply a tool (e.g., a part into which the robotic arm may drill a hole, apply a weld, rivet, etc.), or any object to which the robotic arm may apply a sensor to obtain a measurement (e.g., a temperature measurement, moisture measurement, an image, etc.).

As stated above, an alignment difference may be determined using a current position of an alignment feature in an image captured by an imaging sensor and its reference position in the current image. In some embodiments, the "alignment difference" may be determined by: (1) determining at least one reference position of the at least one alignment feature (e.g., relative to the robot); and (2) determining the alignment difference by determining a difference between the at least one reference position of the at least one alignment feature and the at least one current position of the at least one alignment feature (e.g., relative to the robot). The difference between the current and reference positions of the alignment features may be determined using centroids (or any other suitably defined point) of the alignment features in the at least one captured image.

The alignment feature(s) imaged to determine alignment differences may be of any suitable type. For example, in some embodiments, an alignment feature may be a visual marker. The visual marker may have any suitable graphical pattern. For example, the visual marker may have a bullseye pattern. As another example, the visual marker may be an ArUcO marker. As yet another example, the visual marker may be any suitable marker whose position and/or orientation may be determined from a 2D image of the graphical pattern on the marker. The visual marker may be a sticker or decal placed on the equipment or may be painted and/or drawn on the equipment.

As another example, in some embodiments, the alignment feature may be a visible feature of the equipment. For example, the alignment feature may be an edge of the equipment or a part of the equipment (e.g., an edge of the conveyor belt of the labeller), a corner of the equipment or a part of the equipment, or a component of the equipment having visual characteristics (e.g., a shape, a design, etc.) that may be used to determine the position and/or orientation of the alignment feature from a 2D image of that alignment feature. Other non-limiting examples include a button on a surface of the equipment, a recess area in the equipment, a shape, color, size, texture, any other suitable visible feature, and any suitable combination thereof.

In some embodiments, the at least one alignment feature comprises a first alignment feature and a second alignment feature different from the first alignment feature (e.g., two separate visual markers in different locations on the equipment), the at least one current position of the at least one alignment feature comprises a first current position of the first alignment feature and a second current position of the second alignment feature, and the at least one reference position includes a first reference position for the first alignment feature and a second reference position for the second alignment feature.

As described herein, in some embodiments, prior to aligning the robot and the equipment using computer-vision based techniques, an initial alignment may be obtained using one or more mechanical components and/or one or more other sensors (e.g., distance sensors).

For example, in some embodiments, the robot may be on a robot platform configured to support the robot and the equipment may be on an equipment platform configured to support the equipment. In some such embodiments, the robot platform includes a first docking interface, and the equipment platform includes a second docking interface mateable with the first docking interface. In some embodiments, the first docking interface and/or the second docking interface comprise, and are mateable, via one or more ball bearings and/or one or more detents. As another example, in some embodiments, the robot and the equipment are positioned on a common platform (e.g., the same table), and the robot and/or the equipment are secured to the common platform via alignment pins.

In some embodiments, the initial alignment may be performed using one or more other sensors instead of (or in addition to) using mechanical fixture(s) (e.g., alignment pins and dowels, mating plates etc.). For example, one or more distance sensors (e.g., one or more ultrasound sensors, one or more RADAR sensors, one or more LIDAR sensors, and/or one or more time-of-flight sensors) may be used to obtain a respective distance to a respective reference position on the equipment and/or equipment platform. In turn, the distances may be used to obtain an initial alignment (e.g., as described herein including with reference to FIGS. 6A and 6B). The distance sensor(s) may be disposed on the robot, on a platform supporting the robot, or both on the robot and on the platform supporting the robot. In other embodiments, the distance sensors may be on the equipment, or the equipment platform, or both on the equipment and the equipment platform. In such embodiments, the distance sensors may measure distances to respective reference positions on the robot and/or robot platform to obtain the initial alignment.

As described herein, in some embodiments, any one of numerous computer vision techniques may be used to determine the position and/or orientation of one or more alignment features part of or on equipment to which a robot (or other equipment) is being aligned. The computer vision technique may be a pattern recognition technique, an object detection technique, or a blob detection technique. Any suitable pattern recognition technique may be used including, for example, template matching, geometric pattern matching (based, e.g., on geometric pattern search). Additionally or alternatively, any suitable object detection technique may be used (e.g., using a statistical model, such as a neural network model, for example, a deep learning model, or any other suitable type of statistical model). Additionally or alternatively, any suitable blob detection technique may be used (e.g., the Laplacian of Gaussian technique, the difference of Gaussians technique, determinant of Hessian technique, maximally stable extremal regions technique). In some embodiments, one or more software libraries (e.g., the OpenCV computer vision library, one or more commercially available software libraries such as from LABVIEW, COGNEX (e.g., PATMAX), or other software providers) may be used to implement the functionality of detecting the position and/or orientation of an alignment feature (e.g., visual marker or visible feature) in the image.

Following below are more detailed descriptions of various concepts related to, and embodiments of, techniques for aligning a robot to equipment. It should be appreciated that various aspects described herein may be implemented in any of numerous ways. Examples of specific implementations are provided herein for illustrative purposes only. In addition, the various aspects described in the embodiments below may be used alone or in any combination and are not limited to the combinations explicitly described herein.

Figure 1B:
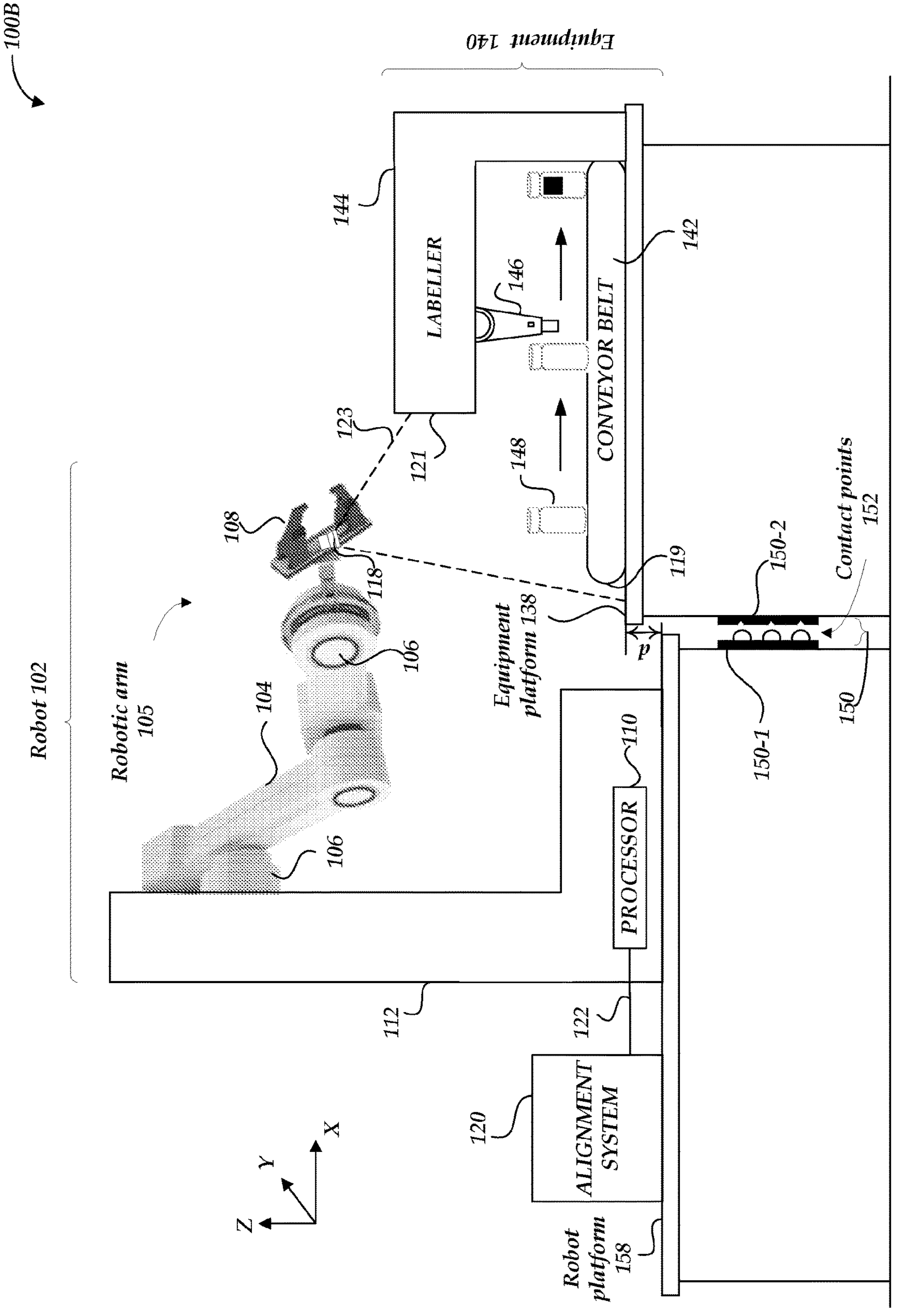
FIG. 1B is a schematic diagram of another illustrative system for configuring a robot, having a robotic arm, to interface with equipment to perform a task, the system enabling the robot to be initially aligned to the equipment using an example mechanical interface and further aligned to the equipment using one or more images obtained from an imaging sensor physically coupled to the robotic arm, in accordance with some embodiments of the technology described herein.
Figure 1C:
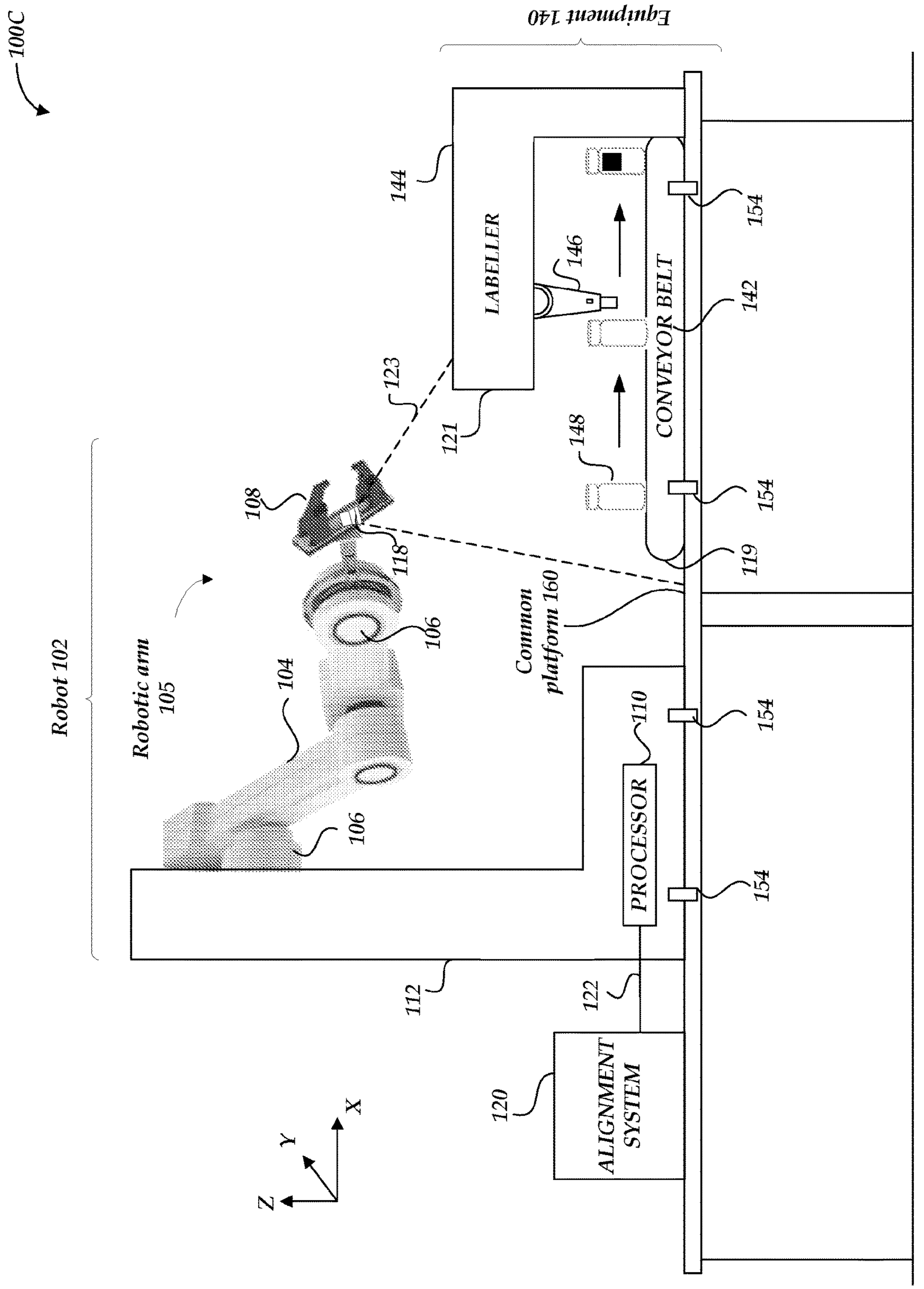
FIG. 1C is a schematic diagram of yet another illustrative system for configuring a robot, having a robotic arm, to interface with equipment to perform a task, the system having the robot and the equipment being positioned on a common platform and enabling the robot to be initially aligned to the equipment using another example mechanical interface and further aligned to the equipment using computer vision techniques, in accordance with some embodiments of the technology described herein.

FIG. 1A is a schematic diagram of an illustrative system 100A for configuring a robot 102, having robotic arm 105, to interface with equipment 140 to perform a task. Generally, equipment 140 may be any suitable thing with respect to which robot 102 can perform a task. Example of equipment are provided herein. The task may include one or more actions taken by the robot and/or one or more actions taken by the equipment. The actions may be coordinated as between robot 102 and equipment 140.

In the example embodiment of FIG. 1A, the equipment 140 is a labelling machine configured to apply labels to vials 148 which are placed on the conveyor belt 142 by the robotic arm 105 so that applicator 146 may apply labels to the vials 148. The vials 148 may be picked up by the robotic arm from one or more trays (not shown in FIG. 1A, but see, e.g., FIG. 10) and placed on the conveyor belt 142 of the labeller which moves the vials past the applicator 146 that applies labels to the vials 148. In this example, the labelling task includes multiple actions taken by the robot in furtherance of performing the task (e.g., picking up multiple vials one-at-a-time and placing them on the conveyor belt) and multiple actions taken by the equipment in furtherance of performing the task (e.g., moving vials past its applicator 146 and applying labels to the vials).

It should be appreciated that the example of the equipment 140 being a labelling machine is illustrative and that the techniques described herein are not limited to being applied to such machines and may be applied to configure a robot to interface with any suitable type of equipment, examples of which are provided herein.

The system 100A enables the robot 102 to be aligned to the equipment 140 using a two-stage procedure. First, the robot 102 and equipment 140 may be initially aligned (or "docked") using docking interface 150. Once docked (and, optionally, clamped into place once aligned using a clamping system, which is not shown in FIG. 1A), computer vision techniques described herein may be used to produce a more accurate alignment. As described herein, the computer vision techniques may use data collected by at least one imaging sensor which, in the illustrative embodiment of FIG. 1A, is imaging sensor 114 positioned such that at least a portion of the equipment 140 is in its field of view 115.

In the example of FIG. 1A, robot 102 includes a robotic arm 105 coupled to body 112. The robotic arm includes one or more links 104 connected by one or more joints 106. The links include an end effector 108. Although in this example, the robotic arm 105 includes two links (segment 104 and end effector 108) and two joints 106, in other examples, a robotic arm may include any suitable number of links and/or joints, as aspects of the technology described herein are not limited in this respect. Moreover, although end effector 108 is a gripper, in other embodiments any other suitable type of end effector may be used, examples of which are provided herein.

As shown in FIG. 1A, robot 102 further includes processor 110 in the body 112 that may be configured to control the robotic arm 105. The processor 110 may include one or multiple processors and/or controllers. Although shown as part of body 112, in other embodiment the processor 110 may be part of robotic arm 105 (e.g., when the robot consists of the robotic arm and does not have a separate body) and/or part of a computer system coupled to the robot and configured to control it (e.g., part of a computer executing robotic arm control software and communicatively coupled to the robotic arm to control it via the software).

As described herein, to enable robot 102 to interface with equipment 140 to collaboratively perform a task (in this example, applying labels to vials), the robot 102 and the equipment 140 need to be aligned so that the relationship between the coordinate systems of the robot 102 and the equipment 140 is known. In particular, the robot 102 needs to have access to precise locations of components of the equipment 140 in the coordinate system for the robot 102 so that the robotic arm 105 can be placed at various precise locations with respect to the equipment 140. For example, in the illustrative application of FIG. 1A, robotic arm 105 needs to be placed at a precise position near the conveyor belt 142 to position vials on the conveyor belt 142. Any error in that positioning could lead to the breaking of the vial, a collision between the gripper 108 and the equipment 140, and/or damage to one or more other things, such as the robot 102, the equipment 140 or other nearby items, all of which is undesirable.

Mathematically, an alignment between coordinate systems refers to a mapping (or "transformation") that may be used to map any position in the coordinate system of the equipment to a position in the coordinate system of the robot. In some embodiments, the mapping may be a rigid transformation from one coordinate system to another. For example, the mapping may be a rotation only, a translation only, or a combination of a rotation and a translation. The mapping may be of any suitable dimension. For example, it may be a 1D, 2D, 3D transformation, in some embodiments.

As described herein, the illustrative system 100 of FIG. 1A enables alignment of the robot 102 and the equipment 140 to be performed in two stages. In the first stage, to reduce the complexity of the overall problem (e.g., from dimensions as described above with reference to FIG. 9A) and to provide for a coarse alignment (that's "roughly" the same as the previous alignment when the robot 102 was previously used to perform a collaborative task with equipment 140), system 100 includes a mechanical interface 150 to dock the robot platform 158 supporting robot 102 and the equipment platform 138 supporting equipment 140.

In the second stage, after, the robot and equipment platforms are docked using the mechanical interface 150, the alignment system 120 uses one or more images collected by imaging sensor(s) 114 to determine an alignment difference from the current alignment between the robot 102 and equipment 140 and a prior alignment between the robot 102 and equipment 140 (which prior alignment may be stored by alignment system 120). In turn, the alignment system 120 may use the alignment difference and the prior alignment to determine the current alignment of the robot 102 and equipment 140, which current alignment may be used to configure the robot 102 to properly interface with equipment 140, for example, by using target offsets to adjust robot positions in programming (e.g., as would be implemented by processor 110) or to calculate needed equipment adjustment for alignment.

As shown in FIG. 1A, the alignment system 120 is communicatively coupled to processor 110 using communication link 122 (which may be wired, wireless, or any suitable combination thereof). In the illustrated embodiment, the alignment system 120 may determine the alignment difference and provide it to processor 110, via communication link 122, so that the processor 110 may take the alignment difference and together with the prior alignment (which may also be received from alignment system 120) determine how to control the robotic arm 105 given the current alignment between the robot 102 and equipment 140. In this embodiment, the alignment system software may be executed on a separate device (e.g., a laptop) from that of the device executing the robotic arm 105 control software (e.g., software running onboard robot 102). In other embodiments, the alignment system 120 may be co-located with the software executing using processor 110 so that the alignment software and the robot control software are implemented together as part of the same system (e.g., robot control software executing on a computer controlling movement of the robotic arm).

Returning to the first alignment stage, as shown in FIG. 1A, the robot 102 and the equipment 140 may be initially aligned by docking their respective platforms (robot platform 158 and equipment platform 138) using mechanical interface 150. In this example, the robot platform 158 and the equipment platform 138 have horizontal surfaces and they are positioned (e.g., locked into) reference positions on a level floor, which reduces the alignment problem to that of aligning two planes. By aligning the Z-planes of the robot and the equipment using horizontal platforms having a fixed height, the alignment problem is reduced from determining six parameters down to determining 3 parameters. When Z-planes for the robot and the equipment are aligned or positioned at a fixed height, the parameters Z, $\beta$ and $\gamma$ between them (see FIG. 9A) are fixed, leaving three parameters X, Y, and $\alpha$ remaining to be determined. The mechanical interface 150, then, is used to fix the remaining three parameters such that the robot platform is relatively fixed to equipment platform in position and orientation.

Figure 5A:
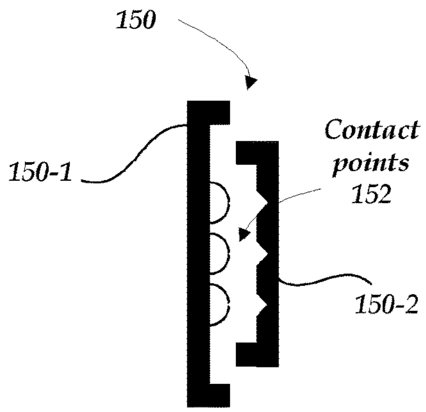
FIG. 5A is a schematic diagram of a mechanical interface that may be used to initially align the robot with equipment, useful with some embodiments of the technology described herein.

In the illustrated embodiment, the mechanical interface 150 includes two mateable portions 150-1 (attached to the robot platform 158) and 150-2 (attached to the equipment platform 138). The mateable portions are attached to respective vertical planes of the robot platform 158 or the equipment platform 138. FIG. 5A further illustrates mechanical interface 150 and indicates that the portions 150-1 and 150-2 are mated using multiple contact points 152.

In the same way that a tripod uses three feet to position itself stably on the ground, at least three points of reference are used to mate/orient a rigid body to a reference plane. Accordingly, in some embodiments, at least three points of reference are used to align the platforms-such that the mechanical interface 150 has at least three contact points. Each contact point may be implemented using any suitable mechanical fixture. For example, the contact points may be implemented, in some embodiments, using ball bearings and detents (e.g., as shown in 5B) or in any other suitable way.

Figure 5B:
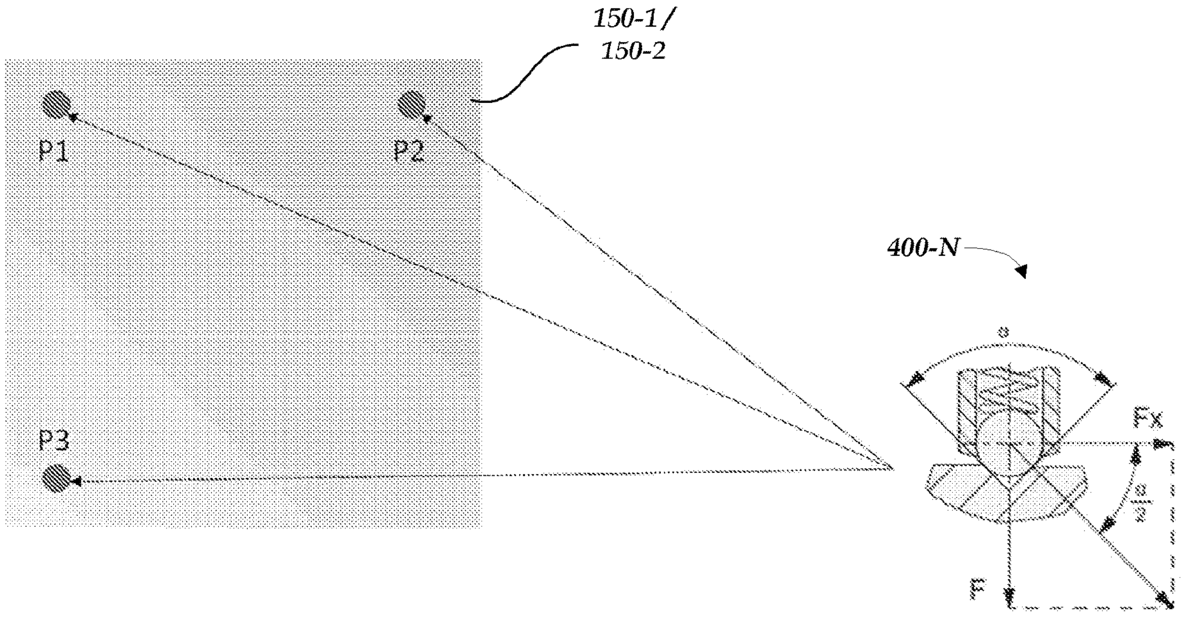
FIG. 5B illustrates aspects of the mechanical interface of FIG. 5A including by showing example positions of contact points in the mechanical interface and an example device to facilitate coupling at a single contact point in the mechanical interface, useful with some embodiments of the technology described herein.

FIG. 5B further illustrates aspects of the mechanical interface of FIG. 5A. FIG. 5B shows example positions of three contact points P1, P2, and P3. The points may be spaced apart from one another (e.g., by a threshold distance) so that they are sufficiently far apart to facilitate achieving a precise alignment. For example, as shown in FIG. 5B, each contact point may be placed near a respective corner of the plate. Other placement of the contact points is possible, however, as aspects of the technology described herein are not limited in this respect. FIG. 5B also illustrates an example of plunger and detent alignment device which may be used to implement a single point contact.

Figure 1D:
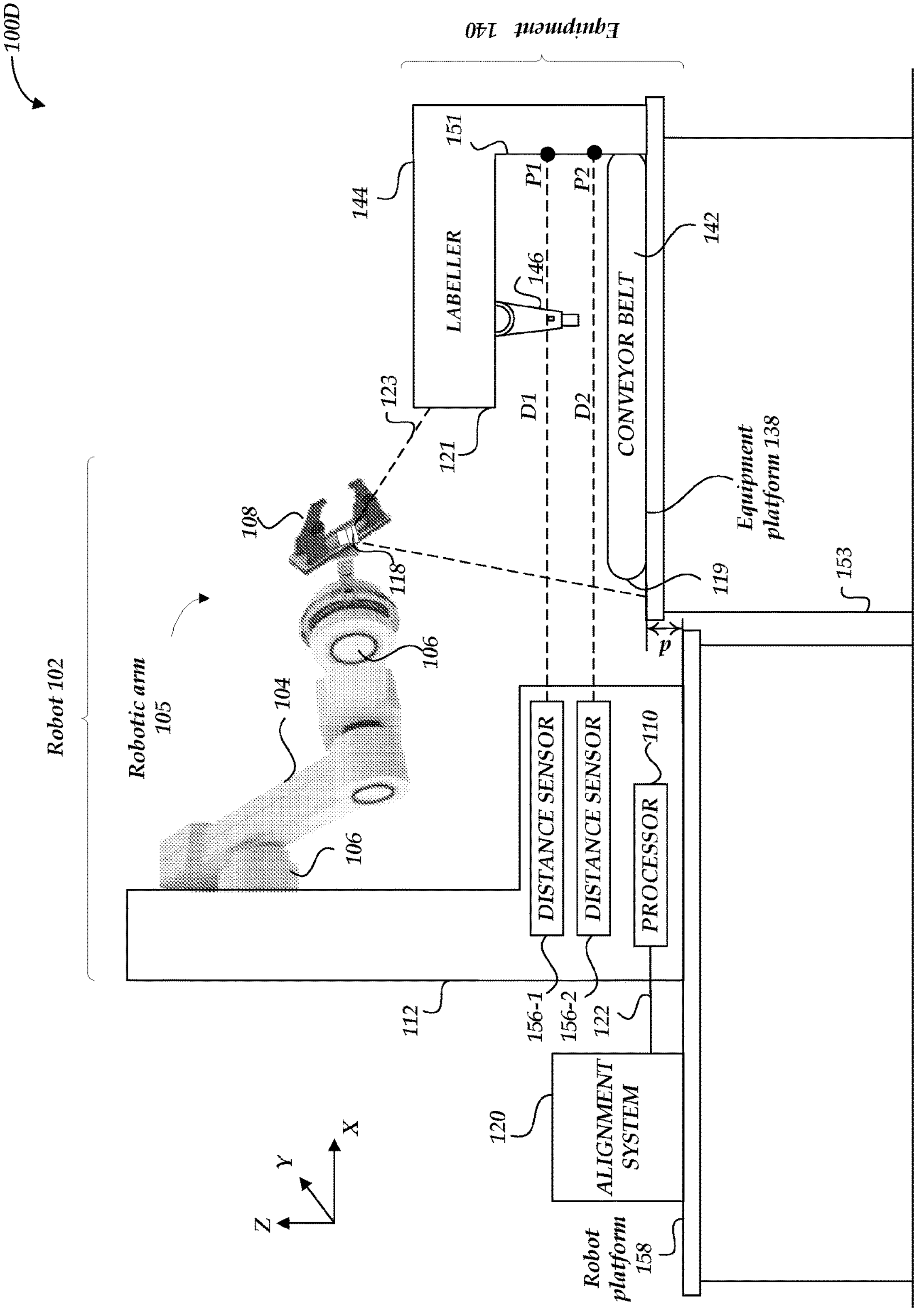
FIG. 1D is a schematic diagram of yet another illustrative system for configuring a robot, having a robotic arm, to interface with equipment to perform a task, the system enabling the robot to be initially aligned to the equipment using one or more distance sensors and further aligned to the equipment using computer vision techniques, in accordance with some embodiments of the technology described herein.

In other embodiments, the robot 102 and equipment 140 may be docked differently. For example, as shown in FIG. 1C, when the robot 102 and equipment 140 are on the same common surface, alignment pins may be used to achieve an initial alignment. As another example, as shown in FIG. 1D, distance sensors may be used to achieve an initial alignment (instead of or in addition to using a mechanical interface).

After the robot and equipment platforms are docked, the robot and the equipment are aligned in both vertical directions (e.g., via alignment of Z-planes) and non-vertical directions (e.g., via the mechanical interface 150). This allows the robot and the equipment to reach a similar alignment relationship for repeated tasks. In other words, each time the robot is docked with the equipment for repeating the same task, the robot and the equipment will be aligned in the roughly the same manner. Starting with this rough docking, a "fine" alignment may be performed using computer vision.

Thus, returning to the second alignment stage, as shown in FIG. 1A, after the robot and equipment platforms are docked, the alignment system 120 may cause imaging sensor(s) 114 to capture one or more images of one or more visual markers (e.g., visual markers 117*a* and 117*b*) and/or one or more visible features of equipment 140 (e.g., edges 121, 144, and conveyor belt 142).

Imaging sensor(s) 114 may be of any suitable type, examples of which are provided herein. In the illustrative embodiment of FIG. 1A, the imaging sensor(s) include a camera, whose field of view 115, includes the visual markers 117*a* and 117*b* and various visible features of the equipment 140 (e.g., conveyor belt edge 119, edge 121 of the labeller arm 144).

In some embodiments, the alignment system 120 may cause the imaging sensor(s) 114 to capture one or more images to use for alignment. In the illustrated embodiment, the imaging sensor(s) are communicatively coupled to robot 102 via communication link 110 (which may be wired, wireless, or any suitable combination thereof) and so the alignment system 120 may control the imaging sensor(s) via the robot 102. In other embodiments, the imaging sensor(s) may be communicatively coupled to the alignment system 120 directly or indirectly in any other way, as aspects of the technology described herein are not limited in this respect.

After the images are captured, the alignment system 120 may compare positions of the visual marker(s) and/or one or more visible features (as detected from the captured images) with previous reference positions of the marker(s) and/or features(s) to determine offsets in the positions of the visual markers. The previous reference positions may have been obtained from images of the marker(s) and/or feature(s) from a previous (e.g., first, last, or other) time that the robot was aligned to the equipment to perform the same task. In turn, the offsets may be used to determine an alignment difference between a prior alignment (between the robot 102 and equipment 140 during a prior performance of the same repeatable task) and the configuration of the robot may be adjusted (e.g., by the alignment system 120) based on the alignment difference, as described herein, including with reference to FIGS. 2 and 3. After the configuration is adjusted, the current alignment may be stored and may be used by the robot 102 to perform one or more actions in furtherance of the task.

Figure 7B:
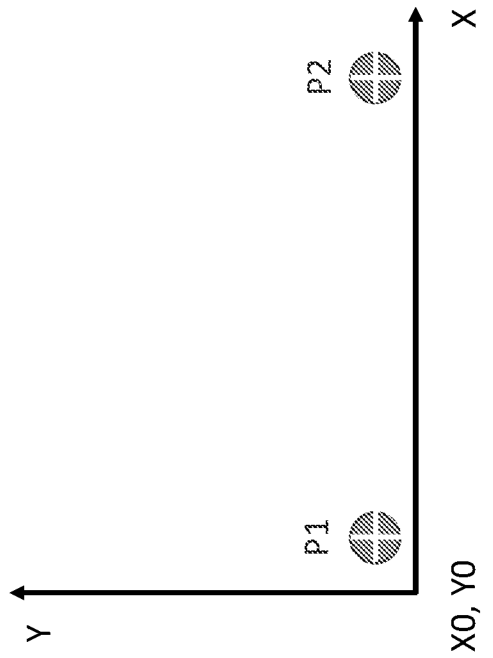
FIGS. 7A-7B illustrate visual markers placed on equipment for use, via computer vision techniques, to update an initial alignment between a robot and equipment, in accordance with some embodiments of the technology described herein.
Figure 7A:
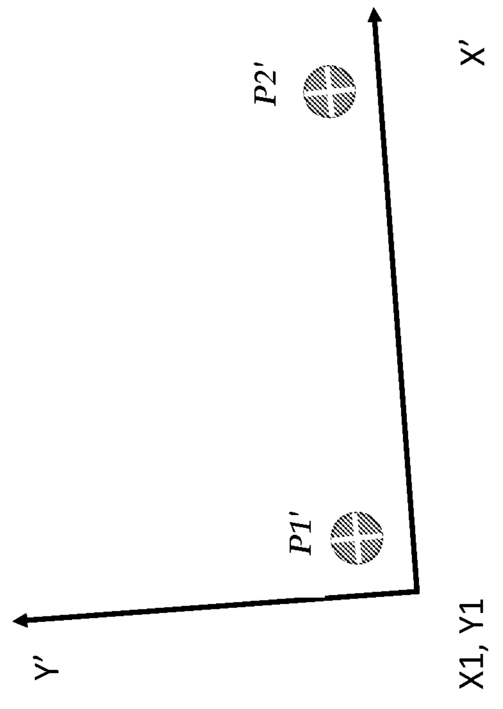
Figure 8A:
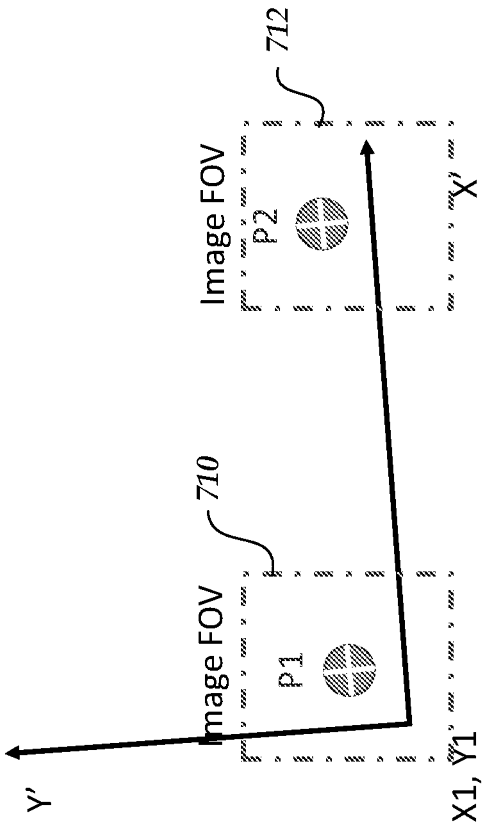
FIGS. 8A-8B illustrating using detected and reference position of visual markers (e.g., the visual markers shown in FIGS. 7A-7B) to determine an alignment difference to use for updating an initial alignment between a robot and equipment, in accordance with some embodiments of the technology described herein.
Figure 8B:
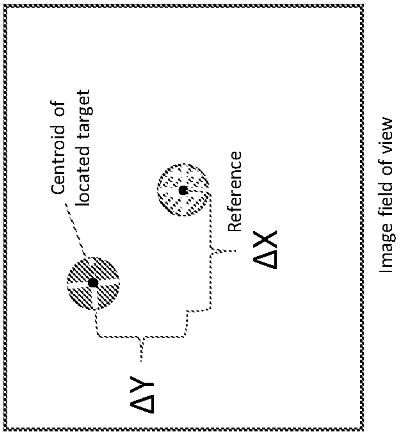

This is illustrated further in FIGS. 7A-7B and 8A-8B. FIGS. 7A and 7B illustrate visual markers placed on equipment for use, via computer vision techniques, for updating an initial alignment between a robot and equipment, in accordance with some embodiments of the technology described herein. As shown in FIG. 8A, images of the two visual markers may be obtained and used to determine the positions of the visual markers relative to the robot. As shown in FIG. 8B, the determined position of each visual marker may be compared to a prior reference position of that reference visual marker. This comparison allows for the determination of offsets between the current and prior reference positions of the markers (e.g., between the current and prior reference positions of their centroids). In turn, the offsets may be used determine an alignment difference between the current and prior alignments. For example, the offsets determined for one marker may be used to determine a translation relative to the coordinate system in the prior alignment and use the offset of the position of the second market to determine a rotation of the coordinate system relative to the prior alignment.

FIGS. 1B-1D illustrate variations of the illustrative system 100A shown in FIG. 1A. FIG. 1B is a schematic diagram of illustrative system 100B for configuring a robot, having a robotic arm, to interface with equipment to perform a task, the system enabling the robot to be initially aligned to the equipment using an example mechanical interface and further aligned to the equipment using one or more images obtained from an imaging sensor physically coupled to the robotic arm, in accordance with some embodiments of the technology described herein. In contrast with the system 100A, where the imaging sensor(s) 114 are separate from the robotic arm 105 such that movement of the robotic arm 105 does not change the position and/or orientation of the imaging sensor(s) 114, the system 100B includes an imaging sensor 118 physically coupled to robotic arm 105 (and, in this example, specifically coupled to gripper 108). In such a configuration, robotic arm 105 may be controlled to move the imaging sensor 118 to a target location for capturing one or more images of the equipment.

As shown in FIG. 1B, the imaging sensor 118 may have a field of view 123 that is different from the field of view 115 of the imaging sensor(s) 114 (in FIG. 1A). The field of view 123 in this example includes the visible features 119 and 121 of the equipment. It is appreciated that the field of view 123 may also change (e.g., via the movement of the imaging sensor 118) so that one or more markers (e.g., 117*a*, 117*b* shown in FIG. 1A) may also be included in the field of view depending on the position of the robotic arm 105. Indeed, the robotic arm 105 may, in some embodiments, be controlled to capture one or more images of visual markers attached to the equipment, if any.

FIG. 1C is a schematic diagram of illustrative system 100C for configuring a robot, having a robotic arm, to interface with equipment to perform a task, the system having the robot and the equipment being positioned on a common platform 160 (e.g., a table) and enabling the robot to be initially aligned to the equipment using another example mechanical interface and further aligned to the equipment using computer vision techniques, in accordance with some embodiments of the technology described herein.

In contrast to the system 100A of FIG. 1A, where the robot 102 and equipment 140 are positioned on horizontal platforms having different heights (and consequently the robot 102 and the equipment 140 are on different Z planes), the common platform 160 positions the robot and the equipment on the same Z-plane. In this configuration, instead of mateable docking interfaces (e.g., plates), the mechanical interface for the system 100C includes alignment pins 154, which may be used to secure the robot and/or the equipment to the common platform 160. As shown in FIG. 1C, the common platform 160 may have a plurality of receptacles each configured to receive a respective one of the plurality of alignment pins at one end, and the robot/equipment may have a plurality of corresponding receptacles each configured to receive a respective one of the plurality of alignment pins at the opposite end. Thus, when the alignment pins are received in corresponding receptacles in the common platform 160 and the robot/equipment, the robot/equipment is secured to the common platform. The alignment pins used in the above-described manner align the robot and the equipment in the non-vertical direction (e.g., in X, Y plane).

As shown in FIG. 1C, at least two alignment pins may be needed for each of the robot and the equipment because at least two points are needed to fix relative position and orientation between two aligned planes, with the first point determining an anchor point and the second point determining the orientation between the two aligned planes. One of the aligned planes may be the common plane, and the other aligned plane may be a surface of the robot or the equipment (e.g., a bottom surface) that contacts the common plane. When both the robot and the equipment are secured in position with respect to the common plane, the robot and the equipment are also secured in position with respect to one another in the non-vertical direction.

Figure 4A:
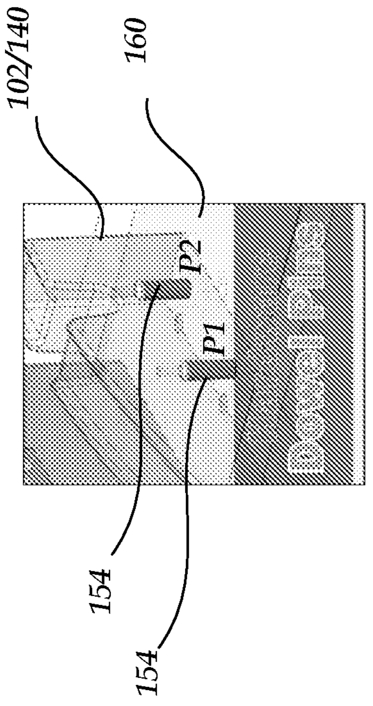
FIG. 4A is a schematic diagram of using alignment pins to position a robot and/or equipment on a reference plane, such as a table, useful with some embodiments of the technology described herein.
Figure 4B:
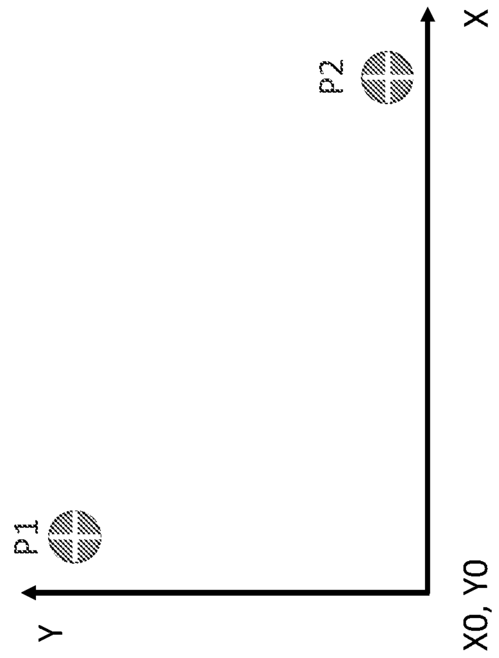
FIG. 4B is a diagram illustrating example alignment pin positions on equipment that may be used to align equipment to fixed robot position, useful with some embodiments of the technology described herein.

Docking using alignment pins is further illustrated in FIGS. 4A and 4B. FIG. 4A is a schematic diagram of using alignment pins 154 to position a robot 102 and/or equipment (140) on a common surface 160, such as a table. In some embodiments, the alignment pins may be made and placed to achieve high precision and tight fit to respective receptacles in the robot platform and/or the equipment platform. For example, the alignment pins 154 may be dowel pins. The dowel pins may be metallic and, for example, may be made of hard metal, such as steel. The dowel pins may be manufactured with a tight tolerance (e.g., within a thousandths of an inch), which enables highly repeatable docking of the robot and the equipment. In some embodiments, the alignment pins may be separated by each other by a threshold distance so that they are sufficiently far apart to facilitate achieving a precise alignment.

FIG. 4B is a diagram illustrating example alignment pin positions on equipment that may be used to align equipment to a fixed robot position. As shown in FIG. 4B, two alignment pins are placed at locations P1, P2 such that the relative distance between P1 and P2 includes offsets in both X and Y directions.

Although FIG. 1C shows that the imaging sensor 118 is physically coupled to the robotic arm 105, other variations are possible. For example, the configuration in FIG. 1C may also work with the imaging sensor installed above the equipment 140 and separately from the robot 120, for example, as shown in FIG. 1A.

FIG. 1D is a schematic diagram of illustrative system 100D for configuring a robot, having a robotic arm, to interface with equipment to perform a task, the system enabling the robot to be initially aligned to the equipment using one or more distance sensors and further aligned to the equipment using computer vision techniques, in accordance with some embodiments of the technology described herein.

In contrast to systems 100A, 100B, and 100C, shown in FIGS. 1A, 1B, and 1C, respectively, which utilize mechanical interfaces to achieve an initial alignment between the robot 102 and equipment 140 (prior to using computer vision to refine the alignment), the system 100D uses distance sensors 156-1 and 156-2 in lieu of a mechanical interface to achieve the initial alignment. The distance sensors may be of any suitable type and, for example, may be include ultrasonic sensors, RADAR sensors, LIDAR sensors, time-of-flight sensors, or any other suitable type of distance sensor.

As shown in FIG. 1D each distance sensor 156-1, 156-2 may be configured to measure a respective distance D1, D2 to a reference point on the equipment, e.g., P1, P2. These distance measurements may be used to reposition the robot and/or equipment until the difference between the measured distances is within a threshold of reference distances measured previously (e.g., distances measured when the robot 102 and equipment 140 were previously aligned to one another). For example, in the illustrated example, the orientation of the robot platform with respect to the equipment platform may be adjusted until the measured distances and within a threshold of the reference distances. The adjustment of the orientations may be done manually (by an operator) or electronically (e.g., by controlling an actuator to move the platform).

In the embodiment of FIG. 1D, the distance sensors are shown as being attached to the robot 102. However, this is not a limitation of the technology described herein. In some embodiments, the distance sensors may be disposed on the robot, on a platform supporting the robot, or both on the robot and on the platform supporting the robot. In other embodiments, the distance sensors may be on the equipment, or the equipment platform, or both on the equipment and the equipment platform. In such embodiments, the distance sensors may measure distances to respective reference positions on the robot and/or robot platform to obtain the initial alignment.

Figure 6B:
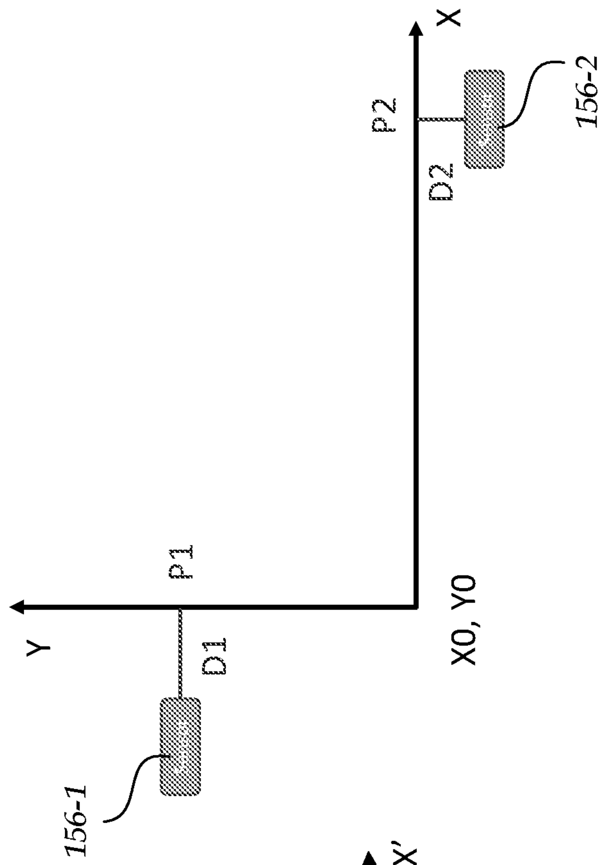
FIGS. 6A-6B illustrate aspects of using distance sensors for initially aligning the robot to equipment, useful with some embodiments of the technology described herein.
Figure 6A:
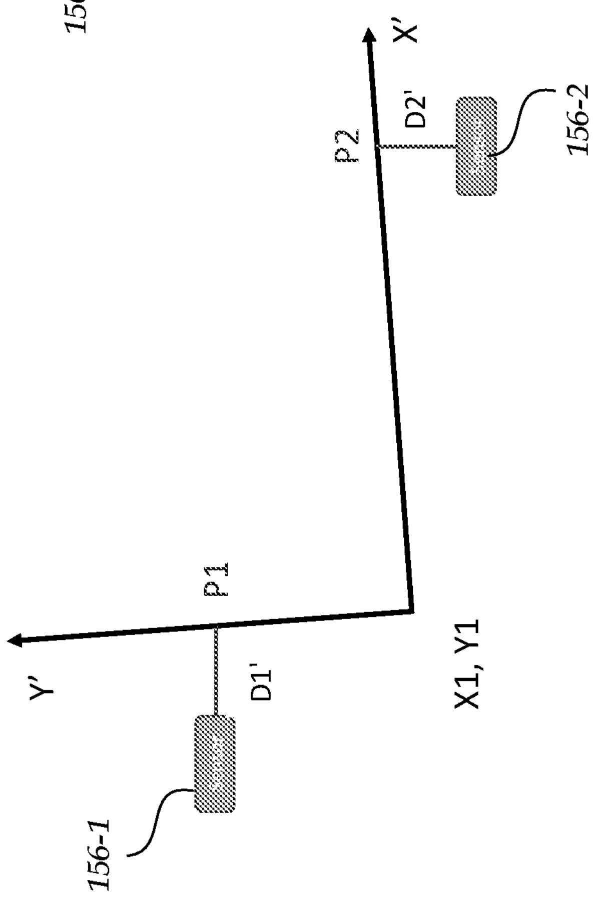

This technique is described further in FIGS. 6A-6B, which illustrate aspects of using distance sensors for initially aligning the robot to equipment. As shown in FIG. 6A, the distances sensors obtain the distances D1' and D2' to reference points P1 and P2 (on the equipment and/or platform support the equipment) at the beginning of the docking. The robot and/or the equipment may then be adjusted until the distances measured by the sensors 156-1 and 156-2 are equal to (or almost equal to within an acceptable tolerance) to the reference distances measured when the robot and equipment were previously aligned.

Figure 1E:
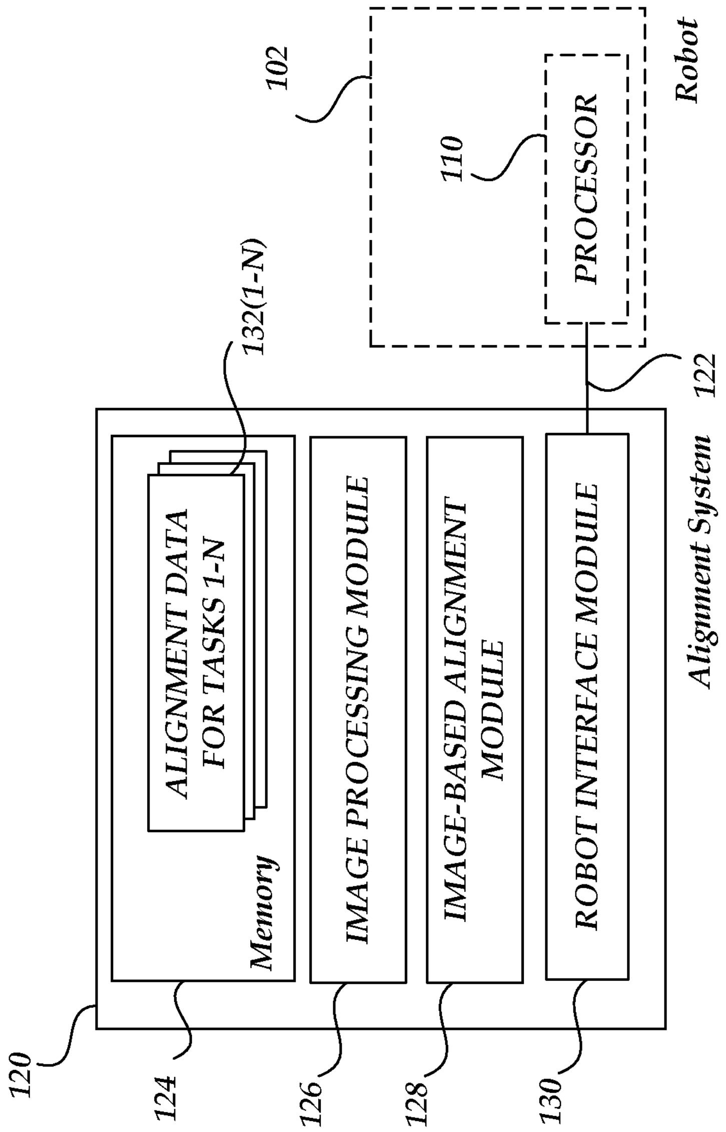
FIG. 1E is a schematic diagram of an illustrative alignment system part of the illustrative systems shown in FIGS. 1A-1D, in accordance with some embodiments of the technology described herein.

FIG. 1E is a schematic diagram of an illustrative alignment system 120 of the illustrative systems shown in FIGS. 1A-1D. As shown in FIG. 1E, alignment system 120 includes memory 124, image processing module 126, image-based alignment module 128, and robot interface module 130.

As described herein, the alignment system 120 may be used to perform a computer-vision based alignment between a robot and equipment with which the robot will interface. This alignment may be performed after an initial docking is performed using a mechanical interface and/or one or more (e.g., distance) sensors, as described herein.

As shown in FIG. 1E, the alignment system includes memory 124 which stores alignment data for one or more alignments 132-1, 132-2, . . . , 132-N (where Nis any suitable integer greater than or equal to 1) for a robot. For example, as the robot is docked and aligned to different pieces of equipment, the alignment system may store alignment data for each such robot-equipment alignment in memory 124. The alignment data for a particular robot-equipment pairing may include one or more prior alignments (e.g., one or more rigid transformations between coordinate system). The alignment data may also store data indicating one or more reference positions to be used in image-based alignment. For example, such data may include reference positions of one or more visual markers and/or visible features on the equipment, which reference positions may be compared with new positions detected upon realignment of a robot to the piece of equipment in order. Thus, a particular piece of alignment data (e.g., 132-1) for the alignment between the robot and a particular piece of equipment may include data about a prior alignment of the robot with that equipment (e.g., a coordinate transformation) as well as image(s) of visual targets and/or visible features taken during the prior alignment.

In some embodiments, image processing module 126 may include any suitable image processing techniques to identify a position of an alignment feature in an image captured by an imaging sensor (e.g., imaging sensor(s) 114 or imaging sensor 118 described with reference to FIGS. 1A and 1B). For example, the image processing module 126 may store software instructions that implement one or more pattern recognition, object detection and/or blob detection techniques to detect the alignment feature and its position in the image. For example, any of these techniques may be used to detect, in the image, the position and/or orientation of one or more visual markers having a known pattern (e.g., a bullseye target, an ArUcO marker, a known graphical pattern). As another example, any suitable feature detection technique may be used to identify visible features on the equipment (e.g., edge detection may be used to detect edges and/or corners when edges and/or corners are used for alignment, pattern matching may be used to identify a visually distinctive portion of the equipment (using a reference image of it) when such a visually distinctive portion is used for alignment). In some embodiments, the image processing module 126 may use image processing techniques from one or more software libraries (e.g., the OpenCV computer vision library) to implement the functionality of detecting the position and/or orientation of an alignment feature (e.g., visual marker or visible feature) in the image.

In some embodiments, image-based alignment module 128 may use the detected positions of the visual marker(s) and/or visible feature(s), which may be provided by the image processing module 126, to determine an alignment difference between a prior alignment between the robot and the equipment and how they are currently aligned. In some embodiments, the image-based alignment module 128 may compute the alignment difference using centroids of (or any other suitable points on) the detected visual marker(s) and/or visible feature(s) and the centroids of the same visual marker(s) and/or visible feature(s) when they are in their reference positions. An example of this is described herein, including with reference to FIGS. 8A-8B.

In some embodiments, the robot interface module 130 may allow the alignment system 120 to interface with robot 102 and provide information and/or control instructions to robot 102. Examples of such information include a determined alignment difference (e.g., offsets), a current alignment, a prior alignment, and/or any other suitable information accessible to the alignment system 120. One example of control instructions is instructions to cause an imaging sensor (e.g., when coupled to or controlled by robot) to capture one or more images of equipment. Another example of control instructions is instructions to cause the robotic arm to interface with the equipment to perform action(s) in furtherance of a task. For example, the alignment system may host software configured to control the robot to perform a particular task (e.g., move robotic arm to place vials from a tray onto a conveyor belt of a labeller) and this software encodes a control loop for the task and makes calls to an API of the robotic arm to move the robotic arm to one or more specific locations and make it perform certain actions with its end effector (e.g., gripping an object, releasing an object, etc.). Such API calls may be made through the robot interface module 130.

It should be appreciated that although alignment system 120 is shown as having three modules which comprise software instructions to perform the above-described tasks, this is by way of example only. In other embodiments, one or more other software modules may be used in addition to or instead of the modules shown in the illustrative example of FIG. 1E.

Figure 2:
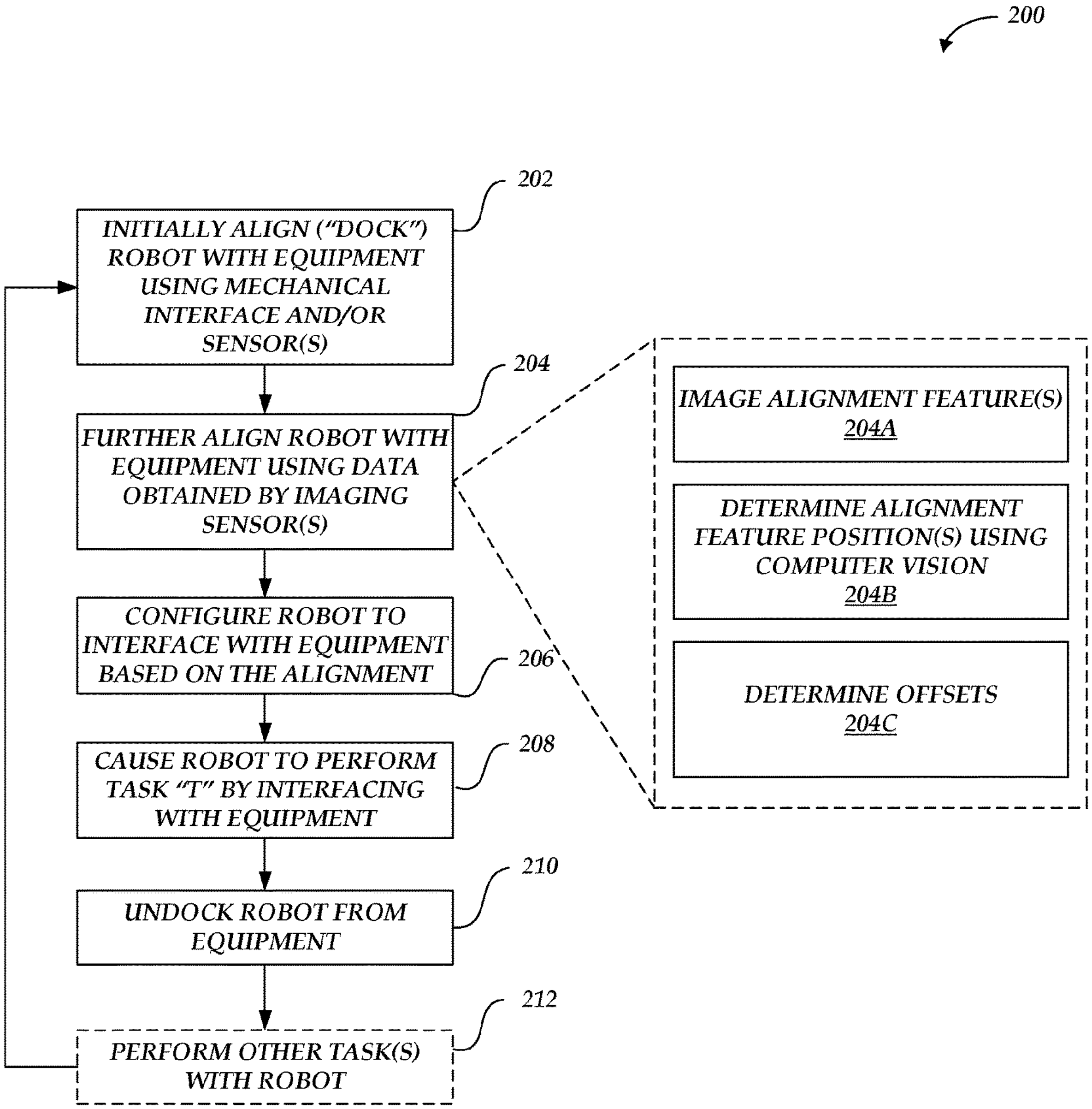
FIG. 2 is a flowchart of an illustrative process 200 for aligning a robot with equipment to perform a collaborative task, in accordance with some embodiments of the technology described herein.

FIG. 2 is a flowchart of an illustrative process 200 for repeatedly aligning a robot with equipment to repeatedly perform a task "T", in accordance with some embodiments of the technology described herein. Process 200 may be performed using any of the illustrative systems 100A, 100B, 100C, and 100D shown in FIGS. 1A-1D. Process 200 may also be performed using the illustrative system 100E shown in FIG. 10. However, it should be appreciated that process 200 may be used with other systems for configuring a robot to interface with equipment, as aspects of the technology described herein are not limited in this respect. Certain acts of process 200 may be performed using one or more processors (e.g., acts 204, 206, and/or 208), which may be part of the same device or different devices.

Process 200 describes how the robot may be repeatedly aligned to that same equipment after having been detached from that equipment so that the robot can be used for other tasks, not just task "T". Prior to the beginning of process 200, a robot has been at least once carefully configured to interface with the equipment to perform the task T. During that initial configuration, reference positions (relative to the robot) for alignment features on the equipment (e.g., one or more visual markers and/one or more visual targets) may be created and stored. For example, an image above the visual markers may be taken and the reference positions (relative to the robot) of the centroids of the markers may be identified and recorded. As another example, one image may be taken for each one of multiple visual markers and the centroids of the marker in it respective image may be identified and recorded. The images taken may also be stored.

Process 200 begins at act 202, where a robot is initially aligned with equipment using a mechanical interface (e.g., comprising one or more mechanical fixtures) and/or one or more sensors (e.g., one or more distance sensors). This initial alignment may involve positioning the robot and the equipment relative to one another to provide an initial (e.g., "rough" or "coarse") alignment. The positioning may be done manually, in some embodiments. However, in other embodiments, where the position of the robot (and/or its robot platform) and/or the equipment (and/or its platform) may be automatically controlled (e.g., using one or more motors and/o actuators), act 202 may be performed electronically. In yet other embodiments, act 202 may be performed in part manually and in part automatically.

Examples of mechanical interfaces that may be used include alignment pins as described herein including with reference to FIGS. 1C and 4A-4B and mateable plates (e.g., with balls bearings and detents) as described herein including with reference to FIGS. 1A, 1B, and 5A-5B. Any other suitable interface may be used, as aspects of the technology described herein are not limited in this respect. For example, magnetic fixtures, electro-mechanical latches, or any other suitable mechanical design may be used, as aspects of the technology described here are not limited in this respect.

In some embodiments, distance sensors may be used instead of a mechanical interface (or in addition to, for example, a partial mechanical interface-such as one alignment pin or mateable plates having fewer than three contact points). This is described herein including with reference to FIGS. 1D, 6A, and 6B.

Therefore, as part of act 202, the relative alignment of the robot and the equipment may be adjusted to dock the robot with the equipment. For example, when alignment is performed using alignment pins (e.g., as shown in FIGS. 4A-4B), the relative position and/or orientation of the robot with respect to the equipment in the X and Y directions may need to be adjusted such that the alignment pins are properly received in respective receptacles. As another example, when alignment is performed using mateable interfaces (e.g., as shown in FIGS. 5A-5B), the relative position and/or orientation of the robot with respect to the equipment in the X and Y directions may need to be adjusted such that the pair of mateable plates are properly positioned and mated. As another example, when alignment is performed using distance sensors (e.g., as shown in FIGS. 6A-6B) the relative position and/or orientation of the robot with respect to the equipment in the X and Y directions may need to be adjusted so that the distances detected by the distance sensors are matched with previously obtained reference distances. The adjustments may be made manually, automatically (e.g., using one or more motors and/or actuators), or in part manually and in part automatically.

Regardless of how the initial alignment is achieved (e.g., whether using a mechanical interface and/or distance sensors), after the initial alignment is completed, the robot and equipment may be clamped into locked positions using any suitable clamping mechanism (e.g., heavy duty locking clamps, bolts, electromagnets, and/or any other suitable means for securing the robot to the equipment). The clamping may secure the relative position of the robot and the equipment once they are docked.

The inventors appreciated that regardless of how the initial alignment is achieved, the initial alignment may not be sufficiently precise for the task to be performed. This is especially the case when distance between the robot and the equipment is large. For example, although the mechanical interfaces described with reference to FIGS. 4A-4B and 5A-5B may be manufactured within tight tolerances (e.g., within a few thousandths of an inch) which may provide sufficient accuracy for the reference positions of X and Y, the orientation angle θ presents a challenge to creating a repeated alignment between the robot and the equipment. That is because a small error in θ may result in significant positional error in X and/or Y direction depending on the distance d between the robot and equipment. For example, the positional error is calculated with the following equations:

$$\Delta x' = d \cdot \cos\Delta\theta$$

$$\Delta y' = d \cdot \sin\Delta\theta.$$

As a result, in cases where the distance d between the robot and the equipment is exceeds a threshold distance, further alignment is needed and as described herein, that further alignment is achieved using computer vision techniques.

Accordingly, after act 202 is completed, process 200 proceeds to act 204, where computer vision techniques are used to further align the robot with the equipment. As described herein, the computer vision techniques involve: (1) determining where the positions of one or more alignment features (e.g., one or more visual markers affixed to or painted on the equipment, or a visual feature of the equipment, such as an edge or a corner) are on the equipment relative to prior reference position(s) of the same alignment feature(s); and (2) using the difference between the current and prior reference positions of the alignment feature(s), which may be termed the "alignment difference", together with the prior alignment, to determine the current alignment. In particular, the current alignment may be obtained using the prior alignment and the difference between the reference position and the current position(s) of the alignment feature(s) as an offset.

For example, as shown using dashed lines, act 204 may involve: (i) imaging 204*a* one or more alignment features (e.g., one or more visual markers) using at least one imaging sensor; (ii) determining 204B the alignment feature position(s) in the captured image(s) using a computer vision technique (e.g., pattern recognition, blob detection, object detection); and (iii) determine offsets 204C between the determined alignment feature position(s) and prior reference positions of the same alignment feature(s). For example, differences between the reference and current positions of one visual marker may be used to determine equipment offset from (X0, Y0) and the differences between reference and current positions of another visual marker may be used to determine the orientation angle θ. Aspects of act 204 are further described herein with reference to FIGS. 3, 7A-7B, and 8A-8B.

It should be appreciated that the computer vision techniques are used to generate an adjustment to the positional adjustment achieved by other means (e.g., mechanical interface and/or image sensors). The two-alignment stages work together. Indeed, for the computer vision techniques to be robust, it is desirable that the adjustment to be made be smaller than ½ of the image field of view and that the image precision is smaller than the requirement of placement precision for the task at hand.

After act 204, process 200 proceed to act 206, where the robot is configured to interface with the equipment based on the alignment determined at act 204. For example, the alignment difference (e.g., comprising X and Y offsets for each visual marker as shown in FIGS. 8A and 8B) may be used to adjust robotic arm positions in programming and/or to calculate needed equipment adjustment for alignment. As such, the alignment difference may be used programmatically by the robot to control its arm to compensate for any disparity between the prior and current alignments. Alternatively, the alignment difference may be used to manually (or automatically when the equipment is on a controllable platform) adjust the position of the equipment to compensate for any disparity between the prior and current alignments. Additionally or alternatively, the alignment difference may be used to manually (or automatically) adjust the position of the robot to compensate between the prior and current alignment.

Next, at act 208, after configuration of act 206, the robot may interface with the equipment to perform one or more actions in furtherance of the desired task "T". For example, the robot may pick up one or more objects (e.g., vials, bottles) and place them on a conveyor belt of a labeller.

After the robot completes interfacing with the equipment to perform task T, the robot is disconnected from the equipment at act 210 (e.g., to the extent a mechanical interface was used, that interface is disengaged, for example, by removing alignment pins or by unmating mateable plates) and the robot is either used to perform one or more other tasks 212 by interfacing with one or more other pieces of equipment or is simply stored for subsequent use.

When, at a later time, the robot is to be used to perform task T again (e.g., another batch of vials, autoinjectors, bottles to be labelled), process 200 returns to acts 202 and 204, where the robot is again initially aligned to the equipment (at act 202) and that initial alignment is adjusted using computer vision (at act 204). In this way, using the two-stage alignment of acts 202 and 204, the robot may be repeatedly configured to interface with the equipment to perform the task "T" and without having to repeat the time-consuming and burdensome initial configuration every time (as is presently the case with conventional approaches, as described above).

It should be appreciated that process 200 is illustrative and that there are variations. For example, in some embodiments, rather than using a two-stage alignment procedure, the entire alignment may be done using data obtained by imaging sensors. In some such embodiments, multiple alignment features part of or on the equipment may be imaged and used to align the robot and the equipment to facilitate interfacing between them.

Figure 3:
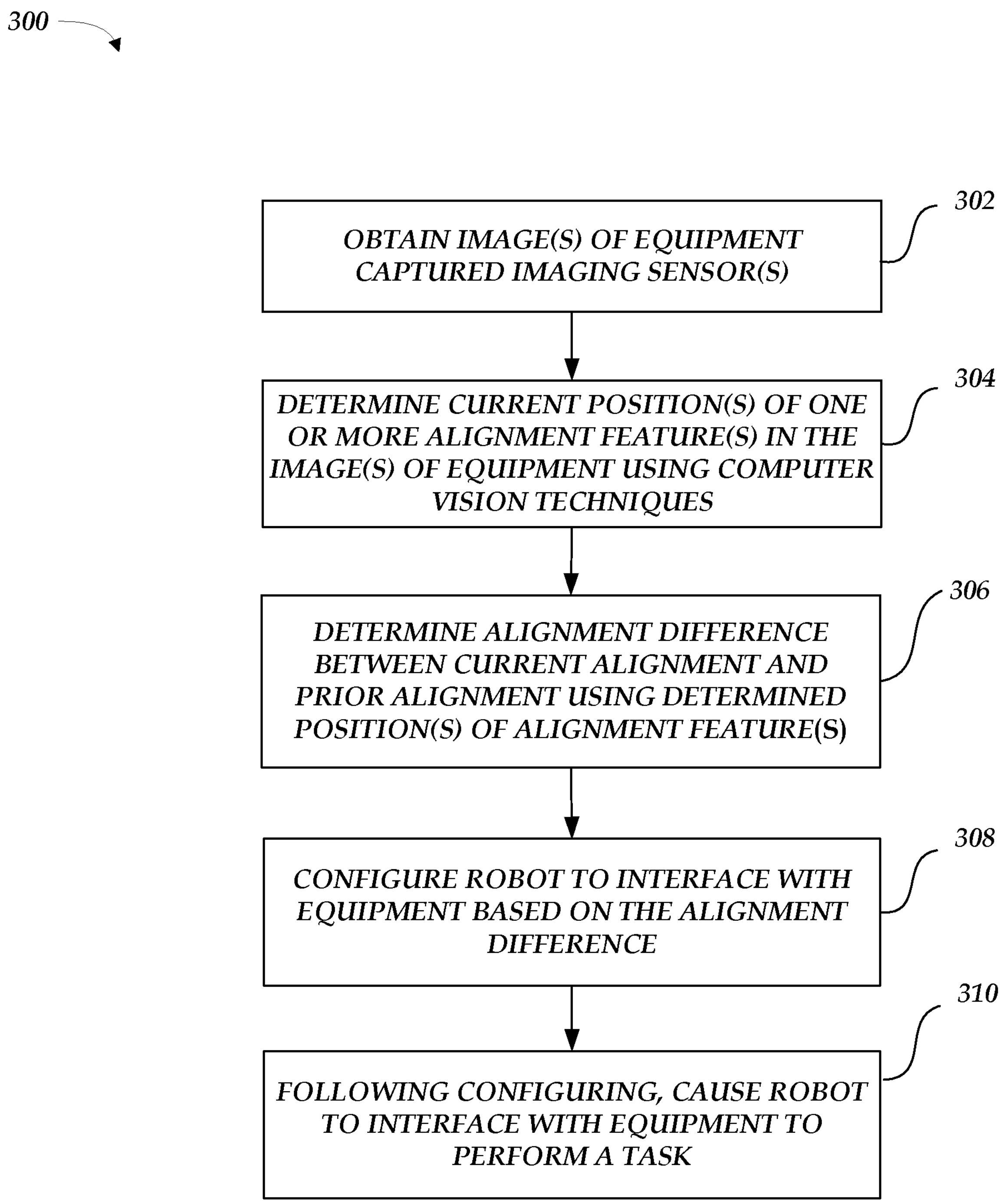
FIG. 3 is a flowchart of an illustrative process 300 for using computer vision to refine an initial alignment between a robot and equipment, in accordance with some embodiments of the technology described herein.

FIG. 3 is a flowchart of an illustrative process 300 for using computer vision to refine an initial alignment between a robot and equipment, in accordance with some embodiments of the technology described herein. In some embodiments, acts 204-208 of process 200 may be implemented using process 300. One or more acts of process 300 may be implemented using one or more modules of alignment system 120 described with reference to FIG. 1E. For example, acts 302, 304 may be implemented using image processing module 126, act 306 may be implemented using the image-based alignment module 128, and acts 308-310 may be implemented using the robot interface module 130.

Process 300 begins at act 302, where one or more images of the equipment to which the robot is being aligned are obtained. The image(s) may have been captured by at least one imaging sensor (e.g., sensors 114 and 118 described with reference to FIGS. 1A and 1B) configured to have at least a portion of the equipment in its field of view (e.g., the portion having at least one visual marker or visible feature thereon). In some embodiments, act 302 involves causing the imaging sensor(s) to capture the image(s), either automatically or manually. In other embodiments, the imaging sensor(s) may have been previously operated to capture the image(s) and act 302 involves accessing the captured image(s).

In some embodiments, a single image may be obtained at act 302. The single image may include multiple visual markers (e.g., two visual markers) and/or multiple visual features (e.g., any feature that may be used for alignment). In other embodiments, given the relative spacing between the visual markers (or the spacing between the visible features) and the positioning of the camera, multiple images may be obtained at act 302.

Each image may have a single alignment feature.

For example, as shown in the illustrative example of FIG. 8A, two images may be obtained at act 302. The first image 710 of equipment has a field of view that includes the first visual marker P1 and the second image 712 has a field of view that includes the second visual marker P2. As described above, taking multiple images may be helpful, given the camera configuration and spacing of the visual marker, so that each visual marker is captured with high resolution using numerous pixels, which will facilitate accurate identification of the visual marker's position in the image when applying computer vision techniques.

Next, process 300 proceeds to act 304, which involves determining the position(s) of one or more alignment features in the captured image(s). As described herein, the alignment feature(s) may be visual marker(s) and/or visible feature(s), examples of which are provided herein. Illustrative visual markers are shown in FIGS. 7A-B and 8A-8B. The positions of the alignment feature(s) may be determined in any suitable way and, for example, may be determined using any one of numerous computer vision techniques appropriate for the type of alignment feature whose position is being detected. Examples of the computer vision techniques have been provided and include pattern recognition, blob detection, and object detection. In some embodiments, determining the position(s) of the alignment feature(s) may involve determining the centroids of the alignment feature(s). For example, as shown in FIG. 8B, centroids of visual markers may be identified as part of act 304. However, the position of an alignment feature need not be the position of the alignment feature's centroid and may be any other suitable point, as aspects of the technology described herein are not limited in this respect.

Next, at act 306, the determined position(s) of the alignment features are compared to their prior reference positions to determine an alignment difference between the current alignment and the prior alignment. The determined and reference positions being compared should be in the same coordinate system, for example, in the coordinate system of the robot or any other suitable coordinate system.

Accordingly, in some embodiments, after the position of the alignment feature(s) (e.g., their centroid(s)) in the image(s) are determined, the determined positions may be transformed to the coordinate system of the robot (e.g., the coordinate system of the robot's robotic arm) so that the positions of the alignment feature(s) are specified relative to the robot. This may facilitate comparing the position(s) of the alignment feature(s) in the images captured at act 302 to their reference positions captured when the robot was initially configured to interface with the equipment, especially if the reference positions were stored in the robot's coordinate system.

In some embodiments, the current positions of the markers may be converted to the coordinate system of the robot based on the pixel locations of the positions of the markers in the captured images. This can be achieved by determining the position of the imaging sensor in the coordinate system of the robot (e.g., in the coordinate system of the robotic arm). This information is readily available when the imaging sensor is located on the robotic arm. When the imaging sensor is not physically coupled to the robot, the position of the imaging sensor (e.g., above the equipment) relative to the robot position may be determined during initial configuration (e.g., prior to start of process 300).

The alignment difference between the current prior alignment may then be determined by comparing the current and prior positions of the alignment features (e.g., visual markers). The alignment difference may include, for each alignment feature (e.g., visual marker), multiple values which may indicate coordinate offsets between the current coordinates of the alignment feature and prior reference coordinates of the alignment feature. For example, as shown in FIG. 8B, the alignment difference may include, for each visual marker shown in FIG. 8A, X and Y offsets (denoted by ΔX and ΔY in the image) between the current and prior reference locations of that visual marker's centroid. In turn, the alignment difference and the prior alignment may be used to determine the current alignment.

As one example, the alignment difference may include respective positional offsets (ΔX, ΔY), and orientation offset 40 (in non-vertical directions), assuming the Z-plane is fixed from docking as previously described. In some embodiments, the offset in X, Y may be determined by the offset of the first marker with respect to its reference position, and the offset in orientation 40 may be determined by the offset of the second marker with respect to its reference position. In the example in FIGS. 7A-8B, P1' (x, y), P2' (x,y) are the current locations of two markers P1, P2 in the captured image (e.g., see FIG. 7A), and P1(x,y) and P2(x,y) are the corresponding reference positions of the two markers (e.g., see FIG. 7B). Thus, the positional offset (ΔX, ΔY) may be determined according to ($P1'_x$-$P1_x$, $P1'_y$-$P1_y$) (see FIG. 8B), and the orientation offset 40 may be determined according to $\tan^{-1}((P2'_x-P2_x)/(P2'_y-P2_y))$.

Figure 8C:
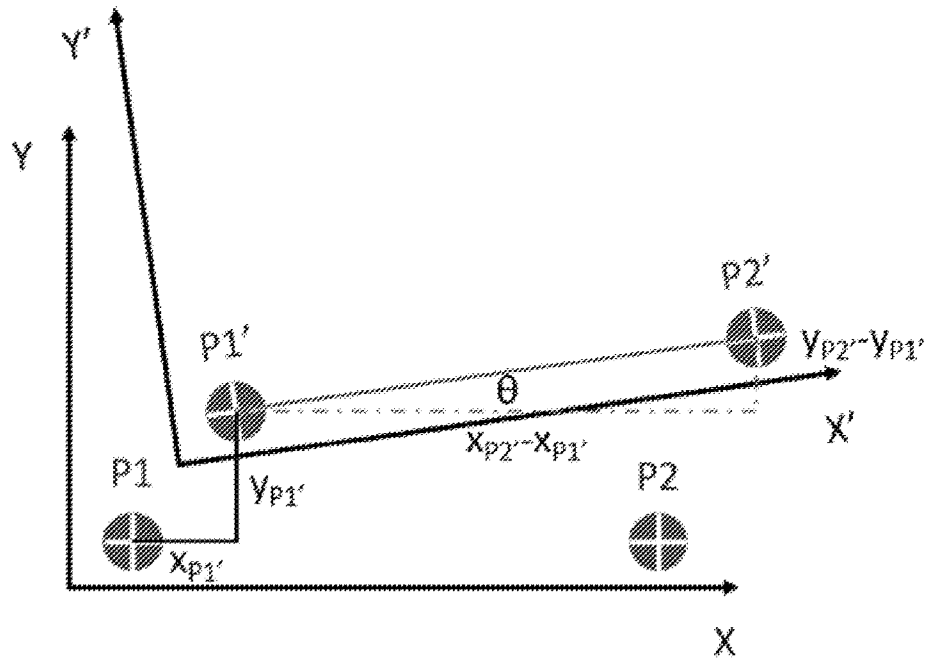
FIG. 8C illustrates a matrix transformation, defined using positional and orientation offsets determined using detected positions and/or orientations of one or more alignment features in one or more images, that may be used to correct the prior alignment to obtain the current alignment, in accordance with some embodiments of the technology described herein.

The positional and/or orientation offsets, part of the alignment difference, may be used to define a transformation that may be used to correct the prior alignment to obtain the current alignment. This transformation is illustrated in FIG. 8C, which illustrates a matrix transformation defined using the offsets x1, y1, and orientation θ. In this example, the centroid of $P_1$ is defined to be (0,0) to simplify the equations shown. As can be appreciated from FIG. 8C, the transform of an arbitrary point from (X, Y) to (X', Y') is equivalent to a rotation of θ about the origin followed by an offset of $x_1$, $y_1$.

As this is an illustrative example, it should be appreciated that other equations may be used to determine the alignment difference and/or more than two markers may be used.

With reference to FIG. 8B, it should also be noted that the field of view of the imaging sensor(s) may be controlled (e.g., as part of act 302) so that the image frame of the captured image encompasses the positional offset ΔX, ΔY of a marker. For example, the field of view of the imaging sensor may be controlled such that the positional offset ΔX, ΔY is smaller than a portion of the field of view (e.g., half of the image field of view). This helps to achieve precise determination of the offsets and facilitates repeatable and robust alignment.

It should be appreciated that, in some embodiments, the computer vision-based alignment may be performed using a single alignment feature rather than multiple alignment features. For example, a single alignment feature (e.g., a single visual marker, a corner, etc.) may be used to determine both the positional and the orientation offsets. As one example, when the visible marker has features having orientation (e.g., an edge, crossing lines as in the example visual marker shown in FIG. 8A), a pattern matching technique may be used to determine both positional and orientation offsets. Thus, in some embodiments, a single alignment feature may be used for alignment. In other embodiments, multiple alignment features may be used, which may improve robustness and/or overall performance of the technique.

Next, process 300 proceeds to act 308 where the robot is configured to interface with the equipment based on the alignment difference determined at act 308. For example, the alignment difference (e.g., comprising X and Y offsets for each visual marker as shown in FIGS. 8A and 8B) may be used to adjust robotic arm positions in programming and/or to calculate needed equipment adjustment for alignment. In some embodiments, the alignment difference may be combined with the prior alignment to determine a current alignment between the robot and the equipment, and the current alignment may be used to update the robot's programming. So updated, the robot is now configured to determine the location of any target with respect to the equipment (e.g., the location of where to place bottles on the conveyor belt) to the robot's coordinate system.

Following the configuration, at act 308, process 300 proceeds to act 310 where the robot (e.g., the robotic arm) is operated to interface with the equipment to perform one or more actions in furtherance of the task that the robot is to perform with respect to the equipment. For example, the robot may pick up one or more objects (e.g., vials, bottles) and place them on a conveyor belt of a labeller. It should be appreciated that process 300 is illustrative and that there are variations. For example, in some embodiments, act 310 may be omitted (e.g., because the robot may interface with the equipment at a later time or not at all if the situation has changed and the robot is needed elsewhere, for example).

Although the technology developed by the inventors is sometimes described herein with reference to the example application of aligning a robot to equipment, the technology developed by the inventors is not limited to being applied to only aligning a robot to equipment and may be applied more generally two align any two (or greater than two) pieces of equipment. For example, the techniques described herein may be applied to aligning two robotic systems or more than two robotic systems. As another example, the techniques described herein may be used to align two pieces of equipment each of which has a conveyance system (e.g., a system configured to move objects from one location to another). For example, the techniques described herein may be used to align two pieces of equipment each having a conveyor belt such that material being moved by one conveyor belt is to be placed on another conveyor belt. In this example, the conveyor belts may be positioned such that objects from one conveyor belt fall on the other conveyor belt or, both the two pieces of equipment with the conveyor belts may each be aligned to a robot (e.g., using the techniques described herein) and the robot may move objects from one conveyor belt to another conveyor belt. In that case, the robot may be aligned with each of the two conveyance systems having their respective conveyor belts using the techniques described herein.

As described herein, more than two pieces of equipment may be jointly aligned using the techniques described herein. This is because alignment may be transitive in the sense that if equipment A were aligned to equipment B and equipment B were aligned to equipment C, then equipment A would be aligned to equipment C.

Next, an example application of the two-stage alignment approach is described herein to the task of labelling components (e.g., autoinjectors), where the robot interfaces with two pieces of equipment, a labeller and component tray(s). The two-stage alignment approach may be applied to this task in the context of system 100E shown in FIG. 10.

Figure 10:
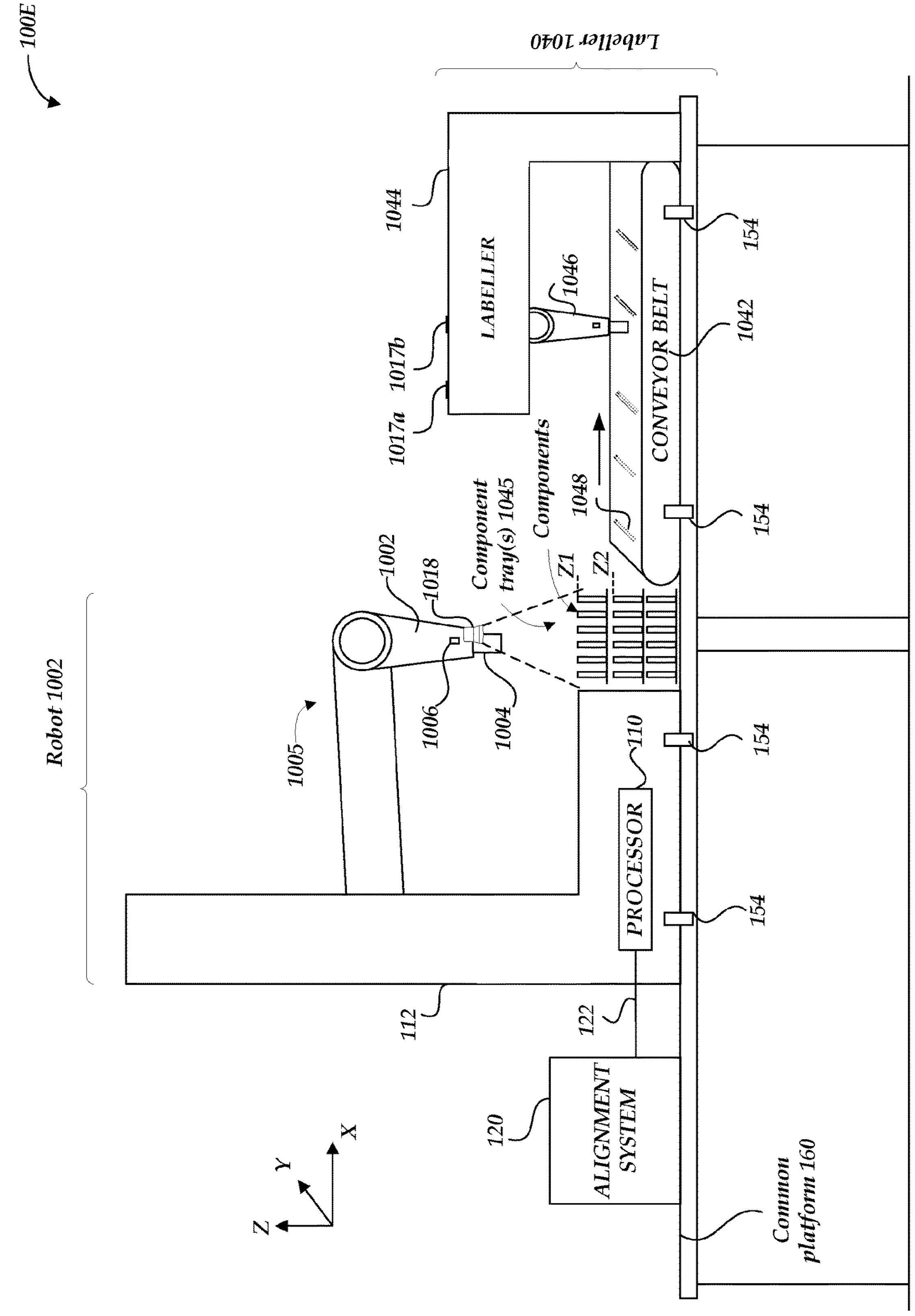
FIG. 10 is a schematic diagram of an illustrative system for configuring a robot to interface with a labeller machine to perform the task of applying labels to components in a component tray, in accordance with some embodiments of the technology described herein.

FIG. 10 is a schematic diagram of an illustrative system 100E for configuring a robot 1002 to interface with a labeller 1040 to perform the task of applying labels to components in one or more component trays 1045, in accordance with some embodiments of the technology described herein. The robot 1002 comprises robotic arm 1005, which may pick up individual components 1048 out of a component tray and place the component tray on the conveyor belt 1042 of the labeller 1044. The conveyor belt 1042 moves the components 1048 past labeller 1046, which labels them.

As shown in FIG. 10, the robotic arm 1005 includes a vacuum head 1004 as an end effector and a pressure sensor 1006, which may be used to measure pressure in the vacuum head to facilitate its operation (e.g., to determine whether an object has been appropriately gripped or released by the vacuum head before causing the robotic arm 1005 to move).

Also as shown in FIG. 10, system 100E includes an imaging sensor 1018 physically coupled to the robotic arm 1005. Movement of the robotic arm 1005 moves the imaging sensor and allows it to image component tray(s) 1045, components 1048, and at least a portion of labeller 1044, depending on the arm's position. As described below, this facilitates alignment of the robot to not only to the labeller, but also to the component trays (so that the robotic arm may accurately pick up components from the component trays). In other embodiments, one or more imaging sensors, which are not physically coupled to the robot may be used (e.g., an imaging sensor having the component trays in its field of view and an imaging sensor having the labeller in its field of view).

The techniques described herein may be used in the context of system 100E to repeatedly align the robot 1002 to the labeller 1004 as well as to the component trays so that the robot 1002 can precisely control its end effector 1004 (in this case a vacuum gripper) to pick up components 1048 from the tray(s) 1045 and place them on conveyor belt 1042.

The alignment between the robot 1002 and the labeller 1040 may be performed using a two-stage alignment technique, as described herein. An initial "coarse" alignment may be achieved using any suitable mechanical interface and/or distance sensors, as described herein. In the example of FIG. 10, the robot 1002 and the labeller 1040 are initially aligned by being placed on a common platform 160 (e.g., a table) and being secured to it by alignment pins 154, like the configuration shown in FIG. 1C. However, in a variation, the robot 1002 and labeller 1040 may be positioned on different platforms, which may be docked to one another using a mechanical interface such as, for example, mechanical interface 150 described herein including with reference to FIGS. 1A and 1B. In another variation, the robot 1002 and labeller may be initially aligned using distance sensors, for example, as described herein with respect to FIG. 1D.

Subsequently to the initial alignment, in a second stage, computer vision techniques may be used to refine the alignment as described herein including with reference to FIGS. 2 and 3. For example, the imaging sensor 1018 may capture at least one image of the labeller and use computer vision techniques to identify the positions of the centroids visual markers 1017*a* and 1017*b* affixed to the labeller. The identified positions of the markers may be compared to prior reference positions of the centroids and the differences between the positions may be used to determine an alignment difference relative to the prior alignment.

In this application, the robot 1002 should also be aligned with component trays 1048. A two-stage procedure may be used for this application as well. First, one or more (e.g., two) component trays may be docked with robot 1002 (or platform 160) using a mechanical interface (e.g., one or more rails, alignment pins, wire baskets, brackets, magnets, electro-mechanical latches, etc.). This provides an initial alignment which may then be tuned using the computer-vision techniques described herein for example including with reference to FIG. 3. An illustrative example of how to do an image-based alignment between the component trays and the robot is explained below with reference to FIG. 11.

in one further example embodiment that may be an illustrative implementation of the system 100E, a robot may sit on an independent wheeled platform which allows the robots to be moved to one or more other stations to perform other tasks with other equipment. A conveyor-fed labeller sits on a fixed table. The wheeled platform and the fixed table connect using a machined interface plate that mates using three points of contact for precise mechanical alignment. Alignment targets placed on the labeller allow for a computer-vision based technique to be used to tune the alignment between the robot and the labeller. A smaller table affixed to the wheeled robot platform holds the component trays (e.g., autoinjector trays). The trays are mechanically aligned using three vertical rails that provide 3 points of contact; only 2 points of contact are needed, but 3 offered better repeatability.

Figure 11:
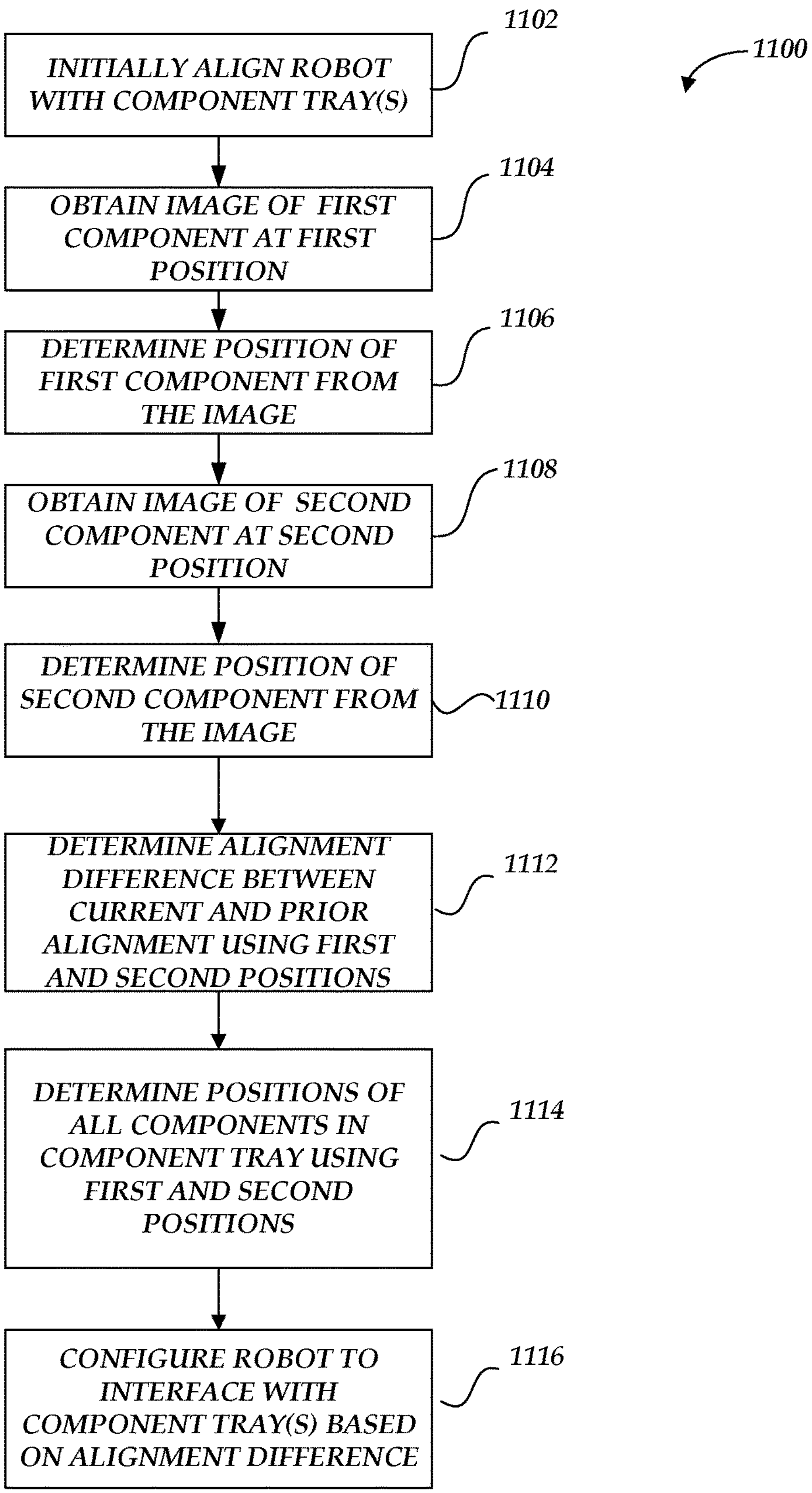
FIG. 11 illustrates a flowchart of an example process 1100 for aligning a robot with one or more component trays, in accordance with some embodiments of the technology described herein.

FIG. 11 illustrates a flowchart of an example process 1100 for aligning a robot with one or more component trays, in accordance with some embodiments of the technology described herein. Process 1100 may be implemented, in part, using alignment system 120 and/or any other suitable computing devices.

Process 1100 begins at act 1102, where the robot is initially aligned with one or more component trays. This may be done using a mechanical interface and/or distance sensors and in any of the ways described herein including with reference to act 202 of process 200.

Next, process 1100 proceeds to act 1104, where an image of a component at a first position the top component tray is obtained. The image may be captured using an imaging sensor coupled to the robotic arm of the robot (see e.g., imaging sensor 1018 described with reference to FIG. 10). Obtaining the image, at act 1104, may comprise capturing the image using the imaging sensor as part of act 1104 (e.g., by causing the imaging sensor to capture the image). The component (e.g., autoinjector) may be in any suitable position in the component tray. For example, components may be arranged as an array along the tray and the first position may be a position at one end of the component tray. Based on information from a prior reference alignment and the initial alignment between the tray(s) and the robot, the imaging sensor may be moved in a position where the component in the first position is in the field of view of the imaging sensor.

Next, process 1100 proceeds to act 1106, where the position of the first component (e.g., an autoinjector positioned at one end of the tray) is determined from the captured image. Any suitable computer vision technique may be used to detect the autoinjector in the captured image and determine its position in the tray. In some embodiments, the position of the first component may be the centroid of the first component. Alternatively, the position may include a point on the autoinjector where an end effector of the robotic arm of the robot will be interfacing. For example, if the autoinjector is placed vertically in the component tray, the position at which the robotic arm's end effector will be in contact with the autoinjector may be the top surface of the autoinjector. If the autoinjector is placed horizontally in the component tray, the position at which the robotic arm's end effector will be in contact with the autoinjector may be the centroid or a middle portion of the autoinjector.

Next, process 1100 proceeds to acts 1108 and 1110, where an image of another component at a second position in the tray is obtained (at 1108) and the position of the second component is determined from the image (at 1110). For example, when the components are arranged in an array, the second component may be positioned at the other end of the array (opposite end from the end at which the first component is positioned). Acts 1108 and 1110 may be performed similarly to how acts 1104 and 1106 were performed.

Next, process 1100 proceeds to act 1112, where the top component tray is aligned to the robot. The top component tray may be aligned to the robot using the determined positions of the first and last components by using these components as "visual markers" in the component tray since their position is fixed within the tray by the way in which the tray is constructed (e.g., using wells or grooves). Thus, the determined positions of the centroids of the components may be compared with their corresponding reference prior positions to determine offsets and, in turn, the offsets may be used to determine an alignment difference from the earlier prior alignment between the robot and a component tray. For example, the alignment difference may include a first alignment value (e.g., a positional offset) and a second alignment value (e.g., an orientation offset), where the first alignment value may be determined based on a difference between the position of the first component and its corresponding reference position and the second alignment value may be determined based on a difference between the position of the second component and its corresponding reference position. In turn, the current alignment between the robot and the component tray(s) may be determined based on the alignment difference and the prior alignment, which is known to the alignment system. Thus, at act 1112, the tray coordinates with respect to the robot based on the current alignment may be determined.

Next, process 1100 proceeds to act 1114, positions of all the other components in the component tray may be determined using the positions of the first component and the second component (determined at acts 1106 and 1110, respectively) and information about layout of components in the first component tray. Since the layout (e.g., information specifying spacing) of components in the component tray is known in advance, the positions of two of the components (e.g., the components on either end of an array of components) may be used to determine (e.g., by interpolation) the positions of each of the other components.

Finally, at act 1116, the robot may be configured to interface with the component tray(s) based on the alignment difference determined at act 114 and the component coordinates determined at act 1114. In some embodiments, the configuration may be done programmatically, by adjusting robot positions based on information (e.g., coordinate offsets, such as x, y, and 0 offsets) in the alignment difference. In some embodiments, the configuration may be done manually by physically adjusting the position of the robot and/or the component tray(s) based on information in the alignment difference.

Figure 12:
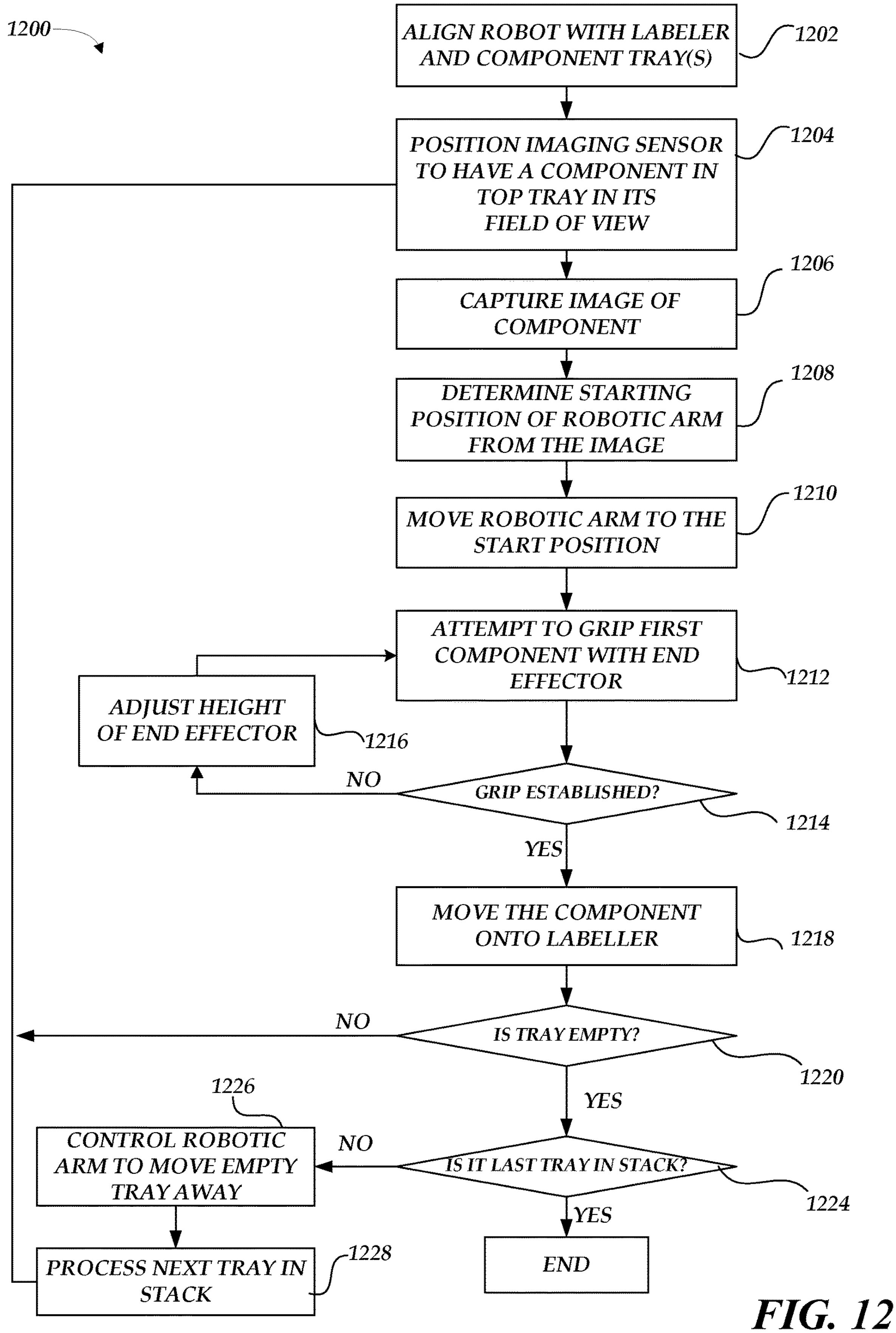
FIG. 12 illustrates a flowchart of an example process 1200 for controlling a robot to interface with equipment including one or more component trays and a labeller machine, in accordance with some embodiments of the technology described herein.

Having described how to align a robot to a labeller and one or more component trays, the robot may be controlled to perform the task of moving components onto the labeller from the component trays. An example of how the robot may be controlled is described next with reference to FIG. 12, which is a flowchart of an example process 1200 for controlling a robot to interface with equipment including one or more component trays and a labeller machine. Process 1200 may be applied in a situation where there are multiple component trays stacked, and the robot may be operable to move, onto the labeller, components in the top tray, followed by the components in the next tray, and so on until all the components in all the trays have been moved to the labeller.

Prior to the start of process 1200, a robot may move its arm to a starting position, one or more trays of components may be loaded onto a platform positioned in front of the robot using fixed alignment pins (or any other mechanical interface). Process 1200 then begins at act 1202, where the robot is aligned to the component tray(s) and to the labeller, as described herein.

Next, process 1200 proceeds to act 1204 to position the imaging sensor (e.g., a camera) to a fixed point above the first component in the top tray so that the first component is in the sensor's field of view. Next, at 1206, an image of the first component is captured by the imaging sensor. The image is analysed using any suitable computer vision technique (e.g., pattern matching) to identify a point on the first component (e.g., its centroid) and the starting position of the robotic arm is updated, at 1208, based on the location of the centroid. In turn, the robotic arm is reoriented to the updated starting position, at 1210, and the robot then uses its arm's end effector to grip the first component. For example, the robot may use the vacuum end effector (e.g., end effector 1004) to pick up the first component at 1212. To this end, vacuum may be applied.

Once the end effector contacts the first component a "grip" check is performed at 1214 to confirm whether a grip on the component has been established. This may be done in any suitable way and, for example, may be done using a pressure sensor (e.g., pressure sensor 1006) coupled to the vacuum head 1004 and configured to measure the pressure in the vacuum head when the vacuum head is in contact with the surface of the component. If the grip is detected, at 1214, then the robot moves the component to the labeller at 1218.

On the other hand, if no grip is detected, the height (e.g., Z-position) of the end effector may be adjusted at 1216 to account for the possibility that the grip failed because the height of the components in some trays may vary. As shown in 1200, the iterative loop of acts 1212, 1214, and 1216 represents a "move and check" routine to detect the Z-position of components in the trays prior to picking them up. In some embodiments, an initial "conservative" position above where the component should be is used to initially position the vacuum head. A grip is then attempted and if no grip is detected (e.g., by the pressure sensor), the vacuum head is lowered by a step, another grip is attempted, and if no grip is again detected, the vacuum head is further lowered iteratively and gradually until the component is gripped by the vacuum pressure. After the component is gripped the height at which the grip was first successful is recorded and used to facilitate gripping the adjacent component (e.g., by having the vacuum head start a short distance above this height).

Once a grip between the end effector and the surface of the component is detected, the robotic arm moves, at 1218 the component onto the labeller. Vacuum continues to be applied during the motion. In some embodiments, the component may be placed directly on the conveyor belt. However, in other embodiments, the component may be placed into a funnel attachment, which facilitates precise placement of the component on the conveyor belt.

In connection with the latter, the inventors recognized that placing a component (e.g., an autoinjector) accurately on a conveyor belt may be challenging given that the conveyor belt is motion and may cause the movement of the conveyor belt. Any inaccurate placement of the autoinjector may cause the label to be applied to a misaligned component. Accordingly, the inventors developed a funnel guide which may be attached to the labeller. The funnel guide may be positioned to receive a component (e.g., an autoinjector) and guide the component onto the conveyor belt. The funnel guide may be shaped based on the shape of the component. For example, as the autoinjector may be a long tube, the funnel guide may be a rectangular shape, where a longitudinal dimension of the bottom of the funnel guide accommodates the length of the autoinjector. In operation, instead of dropping an autoinjector directly onto the conveyor belt, the robotic arm may drop the autoinjector into the funnel guide, which guides the autoinjector to be aligned with and dropped onto the conveyor belt. This achieves an accurate placement (e.g., at a precision of millimeter) of the autoinjector on the conveyor belt and avoids any concerns with misalignment of labels.

Acts 1204-1218 of process 1200 may then be repeated, until the tray is empty. When it is determined that the tray is empty at act 1220 (e.g., when the system fails to detect any component in the current component tray), the robot may move away the empty tray at 1226 to move the empty tray away at act 1226 and proceed to process the next tray in the stack at 1228. This repeats the acts previously described above.

The acts previously described above may apply to each of the trays in the stack (as shown in FIG. 10). As each tray (when empty) is removed, the Z-position of the top surface of the components in the next tray changes. With the robotic arm being configured to adjust the Z-position of its end effector at act 1216 and grip detection at act 1214, interfacing with the components in the next tray in the stack can be achieved in the same manner. When it is determined that the last tray is empty (at act 1224), all trays in the stack are finished and process 1200 ends.

In some embodiments, process 1200 may be configured to deal with a failure to pick up an autoinjector. A failure to pick up an autoinjector may occur when a component is missing from the tray. Thus, in determining the starting position, at act 1208 it may be determined that no component is present in the captured image. In response to determining that a component is missing, the robot may move to the next component and restart from act 1204. A failure to pick up an autoinjector may also occur when the Z-position of the autoinjector varies (e.g., the Z-position of a component differs from the Z-positions of adjacent components). In such case, the adjustment of Z-position of the end effector (1216) and grip detecting (1214) as described above may enable the robot to accommodate variations of heights of the components and achieve a grip for every component.

In some embodiments, performance of process 1200 may be facilitated by using a human machine interface having a screen and a light tower to facilitate interaction between the machines involved in process 1200 and a human operator. There are two steps where a human operator is involved. When trays are loaded onto the robot, the human operator selects the number of trays that are loaded and initiate the loading process. The other human machine interaction is when the human addresses an error. The presence of an error (e.g., in a subroutine) may, in some embodiments, be indicated to the human operator by the change of color in the light tower. For example, if a pick-up of a component is successful, the green light is turned on, whereas if an error is detected a red light is turned on, and the human operator knows to check the screen to understand the nature of the error and how it may be troubleshooted.

Figure 13:
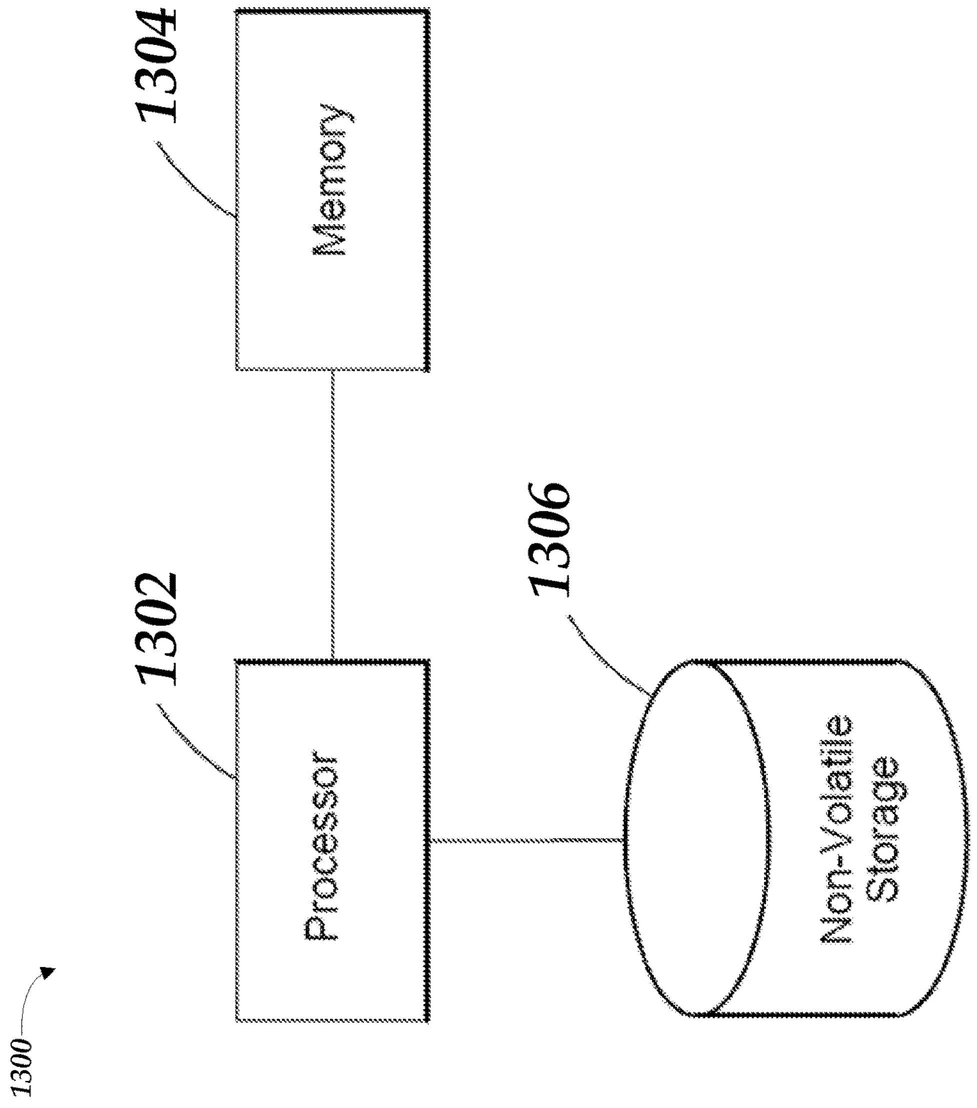
FIG. 13 schematically illustrates components of a computer that may be used to implement some embodiments of the technology described herein.

An illustrative implementation of a computer system 1300 that may be used in connection with any of the embodiments of the disclosure provided herein is shown in FIG. 13. For example, any of the computing devices described above may be implemented as computing system 1300. The computer system 1300 may include one or more computer hardware processors 1302 and one or more articles of manufacture that comprise non-transitory computer readable storage media (e.g., memory 1304 and one or more non-volatile storage devices 1306). The processor 1302 (*s*) may control writing data to and reading data from the memory 1304 and the non-volatile storage device(s) 1306 in any suitable manner. To perform any of the functionality described herein, the processor(s) 1302 may execute one or more processor-executable instructions stored in one or more non-transitory computer-readable storage media (e.g., the memory 1304), which may serve as non-transitory computer-readable storage media storing processor-executable instructions for execution by the processor(s) 1302.

Various inventive concepts may be embodied as one or more methods, of which examples have been provided (e.g., the methods illustrated and described with reference to FIGS. 2, 3, 11, and 12). The acts performed as part of a method may be ordered in any suitable way. Accordingly, embodiments may be constructed in which acts are performed in an order different than illustrated, which may include performing some acts simultaneously, even though shown as sequential acts in illustrative embodiments.

The various methods or processes outlined herein may be coded as software that is executable on one or more processors that employ any one of a variety of operating systems or platforms. Additionally, such software may be written using any of numerous suitable programming languages and/or programming or scripting tools and may be compiled as executable machine language code or intermediate code that is executed on a virtual machine or a suitable framework.

The terms "program" or "software" or "application" are used herein in a generic sense to refer to any type of computer code or set of processor-executable instructions that may be employed to program a computer or other processor to implement various aspects of embodiments as described above. Additionally, according to one aspect, one or more computer programs that when executed perform methods of the disclosure provided herein need not reside on a single computer or processor but may be distributed in a modular fashion among different computers or processors to implement various aspects of the disclosure provided herein.

Processor-executable instructions may be in many forms, such as program modules, executed by one or more computers or other devices. Program modules include routines, programs, objects, components, data structures, etc. that perform particular tasks or implement particular abstract data types. Typically, the functionality of the program modules may be combined or distributed.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, for example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term). The phraseology and terminology used herein is for the purpose of description and should not be regarded as limiting. The use of "including," "comprising," "having," "containing," "involving," and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A system for configuring a robot to interface with equipment to perform a task, the robot comprising a robotic arm, the system comprising:

at least one imaging sensor; and at least one processor configured to:

obtain at least one image of the equipment captured by the at least one imaging sensor;

determine at least one current position of at least one alignment feature in the at least one captured image, wherein the at least one alignment feature is part of or on the equipment;

determine, using the at least one current position of the at least one alignment feature in the at least one captured image, an alignment difference between a current alignment and a prior alignment of the robot and the equipment; and configure the robot to interface with the equipment based on the alignment difference.

2. The system of claim 1, wherein the at least one processor is further configured to:

following the configuring, cause the robotic arm to interface with the equipment to perform one or more actions in furtherance of the task.

3. The system of claim 1, wherein the system comprises the robot.

4. The system of claim 3, wherein the robotic arm comprises one or more links, including an end effector, and zero, one or more joints between the one or more links; and at least one actuator configured to move at least one of the one or more links to cause the robotic arm to interface with the equipment using its end effector.

5. The system of claim 1, wherein the at least one imaging sensor comprises a camera.

6. The system of claim 1, wherein the at least one imaging sensor comprises a plurality of imaging sensors.

7. The system of claim 1, wherein the at least one imaging sensor is separate from the robot.

8. The system of claim 1, wherein the at least one imaging sensor is physically coupled to the robotic arm.

9. The system of claim 8, wherein the at least one processor is configured to:

control a position and/or an orientation of the at least one imaging sensor so that the at least one alignment feature is in a field of view of the at least one imaging sensor when the at least one imaging sensor is used to capture the at least one image.

10. The system of claim 1, wherein the at least one processor is further configured to:

determine the current alignment based on the prior alignment and the alignment difference; and configure the robot to interface with the equipment according to the current alignment.

11. The system of claim 1, wherein the at least one processor is configured to determine the alignment difference by:

determining at least one reference position of the at least one alignment feature; and determining the alignment difference by determining a difference between the at least one reference position of the at least one alignment feature and the at least one current position of the at least one alignment feature.

12. The system of claim 11, wherein the at least one processor is configured to determine the difference between the at least one reference position of the at least one alignment feature and the at least one current position of the at least one alignment feature by:

determining a difference between coordinates of centroids of the at least one alignment feature in the reference and current positions.

13. The system of claim 11, wherein:

the at least one alignment feature comprises a first alignment feature and a second alignment feature different from the first alignment feature, the at least one current position of the at least one alignment feature comprises a first current position of the first alignment feature and a second current position of the second alignment feature, and the at least one reference position includes a first reference position for the first alignment feature and a second reference position for the second alignment feature.

14. The system of claim 13, wherein the alignment difference comprises:

a first value determined based on a difference between the first reference position of the first alignment feature and the first current position of the first alignment feature; and a second value determined based on a difference between the first reference position of the second alignment feature and the second current position of the second alignment feature.

15. The system of claim 13, wherein:

the first alignment feature comprises a first visual marker attached to the equipment, and the second alignment feature comprises a second visual marker attached to the equipment.

16. The system of claim 13, wherein the at least one processor is configured to determine the at least one current position of at least one alignment feature in the at least one captured image by using a pattern matching technique, an object detection technique, or a blob detection technique.

17. The system of claim 15, wherein:

the at least one captured image comprises a first image containing an image of the first visual marker and a second image containing an image of the second visual marker; and the at least one processor is configured to determine the first current position of the first visual marker using the first image and determine the second current position of the second visual marker using the second image.

18. The system of claim 1, wherein:

the at least one alignment feature comprises a first alignment feature, the first alignment feature comprises a visible feature of the equipment, and the at least one processor is configured to determine the at least one current position of the at least one alignment feature in the at least one captured image by detecting the visible feature of the equipment in the at least one captured image, wherein the visible feature is a component of the equipment, an edge of the equipment, or a corner of the equipment.

19. The system of claim 1, further comprising:

a robot platform configured to support the robot; and an equipment platform configured to support the equipment, wherein:

the robot platform comprises a first docking interface; and the equipment platform comprises a second docking interface mateable with the first docking interface.

20. The system of claim 19, further comprising:

one or more distance sensors supported by the robot platform, each of the one or more distance sensors configured to obtain a respective distance to a respective reference position on the equipment and/or equipment platform, wherein the one or more distance sensors comprise a first distance sensor, the first distance sensor comprising an ultrasound sensor, a RADAR sensor, a LIDAR sensor, or a time-of-flight sensor.

21. The system of claim 1, wherein the robot and the equipment are positioned on a common platform, wherein the robot and/or the equipment are secured to the common platform via alignment pins.

22. A method for configuring a robot to interface with equipment to perform a task using at least one imaging sensor, the robot comprising a robotic arm, the method comprising:
using at least one processor to perform:
obtaining at least one image of the equipment captured by the at least one imaging sensor;
determining at least one current position of at least one alignment feature in the at least one captured image, wherein the at least one alignment feature is part of or on the equipment;
determining, using the at least one current position of the at least one alignment feature in the at least one captured image, an alignment difference between a current alignment and a prior alignment of the robot and the equipment; and
configuring the robot to interface with the equipment based on the alignment difference.

23. The method of claim 22, further comprising:
following the configuring, causing the robotic arm to interface with the equipment to perform one or more actions in furtherance of the task.

24. The method of claim 22, further comprising:
prior to the at least one imaging sensor capturing the at least one image,
initially aligning the robot with the equipment using one or more mechanical devices and/or one or more sensors.

25. The method of claim 24, wherein initially aligning the robot with the equipment comprises mating a robot platform configured to support the robot with an equipment platform configured to support the equipment, the mating performed using the one or more mechanical devices.

26. The method of claim 24, further comprising:
after causing the robotic arm to interface with the equipment,
undocking the robot from the equipment;
after the undocking, using the robot to perform one or more other tasks with other equipment; and
after using the robot to perform one or more other tasks, again initially aligning the robot to the equipment using the one or more mechanical devices and/or the one or more sensors.

27. The method of claim 26, further comprising:
after again initially aligning the robot to the equipment, using the at least one processor to perform:
obtaining at least one second image of the equipment captured by the at least one imaging sensor;
determining at least one second current position of the at least one alignment feature in the at least one captured image;
determining, using the at least one second current position of the at least one alignment feature in the at least one captured image, a second alignment difference between a second current alignment and a second prior alignment of the robot and the equipment;
configuring the robot to interface with the equipment based on the second alignment difference; and
following the configuring, causing the robotic arm to interface with the equipment to perform one or more actions in furtherance of the task.

28. The method of claim 22, further comprising, by the at least one processor:
controlling a position and/or an orientation of the at least one imaging sensor so that the at least one alignment feature is in a field of view of the at least one imaging sensor when the at least one imaging sensor is used to capture the at least one image.

29. The method of claim 22, further comprising, by the at least one processor:
determining the current alignment based on the prior alignment and the alignment difference; and
configuring the robot to interface with the equipment according to the current alignment.

30. The method of claim 22, wherein determining the alignment difference comprises:
determining at least one reference position of the at least one alignment feature; and
determining the alignment difference by determining a difference between the at least one reference position of the at least one alignment feature and the at least one current position of the at least one alignment feature.

31. The method of claim 30, wherein determining the difference between the at least one reference position of the at least one alignment feature and the at least one current position of the at least one alignment feature comprises:
determining a difference between coordinates of centroids of the at least one alignment feature in the reference and current positions.

32. The method of claim 30, wherein:
the at least one alignment feature comprises a first alignment feature and a second alignment feature different from the first alignment feature,
the at least one current position of the at least one alignment feature comprises a first current position of the first alignment feature and a second current position of the second alignment feature, and
the at least one reference position includes a first reference position for the first alignment feature and a second reference position for the second alignment feature.

33. The method of claim 32, wherein the alignment difference comprises:
a first value determined based on a difference between the first reference position of the first alignment feature and the first current position of the first alignment feature; and
a second value determined based on a difference between the first reference position of the second alignment feature and the second current position of the second alignment feature.

34. The method of claim 32, wherein:
the first alignment feature comprises a first visual marker attached to the equipment, and
the second alignment feature comprises a second visual marker attached to the equipment.

35. The method of claim 34, wherein determining the at least one current position of at least one alignment feature in the at least one captured image comprises using a pattern matching technique, an object detection technique, or a blob detection technique.

36. The method of claim 34, wherein:
the at least one captured image comprises a first image containing an image of the first visual marker and a second image containing an image of the second visual marker; and
determining the at least one current position of the at least one alignment feature in the at least one captured image comprises determining the first current position of the first visual marker using the first image and determine the second current position of the second visual marker using the second image.

37. The method of claim 22, wherein:

the at least one alignment feature comprises a first alignment feature, the first alignment feature comprises a visible feature of the equipment, and determining the at least one current position of the at least one alignment feature in the at least one captured image comprises detecting the visible feature of the equipment in the at least one captured image, wherein the visible feature is a component of the equipment, an edge of the equipment or a corner of the equipment.

38. At least one non-transitory computer-readable medium storing processor-executable instructions that, when executed by at least one computer hardware processor, cause the at least one computer hardware processor to execute the method of claim 30.

39. The method of claim 23, wherein the equipment comprises a labeler machine, wherein the at least one imaging sensor comprises a first imaging sensor coupled to the robotic arm, and wherein causing the robotic arm to interface with the equipment to perform one or more actions in furtherance of the task comprises:

positioning the first imaging sensor to have a particular component in a first component tray in its field of view;

capturing an image of the particular component using the first imaging sensor;

determining a starting position of the robotic arm from the image;

gripping the particular component with an end effector of the robotic arm; and moving the particular component onto the labeler machine for being labeled by the labeler machine.

* * * * *